(12) United States Patent
Rieger et al.

(10) Patent No.: US 8,365,626 B2
(45) Date of Patent: *Feb. 5, 2013

(54) DOUBLE CLUTCH TRANSMISSION

(75) Inventors: Wolfgang Rieger, Friedrichshafen (DE); Philip Recker, Friedrichshafen (DE); Gerhard Gumpoltsberger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 427 days.

This patent is subject to a terminal disclaimer.

(21) Appl. No.: 12/758,958

(22) Filed: Apr. 13, 2010

(65) Prior Publication Data

US 2010/0257957 A1 Oct. 14, 2010

(30) Foreign Application Priority Data

Apr. 14, 2009 (DE) .................. 10 2009 002 345

(51) Int. Cl.
*F16H 3/08* (2006.01)

(52) U.S. Cl. ........................................................ 74/330

(58) Field of Classification Search ............... 74/330, 74/333, 340

See application file for complete search history.

(56) References Cited

U.S. PATENT DOCUMENTS

| | | | |
|---|---|---|---|
| 6,869,379 B2 * | 3/2005 | Voss et al. ............... | 475/218 |
| 7,066,043 B2 * | 6/2006 | Kim et al. ................ | 74/330 |
| 7,225,696 B2 * | 6/2007 | Gitt ........................ | 74/340 |
| 7,597,644 B2 * | 10/2009 | Rodgers, II ............. | 475/218 |
| 7,604,561 B2 * | 10/2009 | Earhart .................... | 475/218 |
| 7,604,565 B2 * | 10/2009 | Lee et al. ................. | 477/3 |
| 8,051,732 B2 * | 11/2011 | Gitt ......................... | 74/331 |
| 2005/0000307 A1 | 1/2005 | Gumpoltsberger | |
| 2009/0036247 A1 * | 2/2009 | Earhart et al. .......... | 475/35 |

FOREIGN PATENT DOCUMENTS

| | | |
|---|---|---|
| DE | 38 22 330 A1 | 7/1989 |
| DE | 100 15 336 A1 | 10/2001 |
| DE | 103 05 241 A1 | 9/2004 |
| DE | 10 2004 001 961 A1 | 8/2005 |
| DE | 10 2005 028 532 A1 | 12/2006 |
| DE | 10 2007 049 257 A1 | 4/2009 |
| DE | 10 2007 049 259 A1 | 4/2009 |
| DE | 10 2007 049 260 A1 | 4/2009 |
| DE | 10 2007 049 263 A1 | 4/2009 |
| DE | 10 2007 049 264 A1 | 4/2009 |
| DE | 10 2007 049 265 A1 | 4/2009 |
| DE | 10 2007 049 266 A1 | 4/2009 |
| DE | 10 2007 049 267 A1 | 4/2009 |
| DE | 10 2007 049 269 A1 | 4/2009 |
| DE | 10 2007 049 270 A1 | 4/2009 |

* cited by examiner

*Primary Examiner* — Ha D. Ho

(74) *Attorney, Agent, or Firm* — Davis & Bujold, PLLC

(57) ABSTRACT

A double clutch transmission comprising two clutches, the input sides of which are connected to a drive shaft and the output sides of which are connected to one of two transmission input shafts coaxially arranged with respect to each other. At least two countershafts are provided on which toothed gearwheels, embodied as idler gearwheels, are supported. Toothed gearwheels, embodied as fixed gearwheels, are provided on both transmission input shafts in a rotationally fixed manner. At least one shift element is provided for connecting two toothed gearwheels in a rotationally fixed manner and at least a plurality of power shifting forward gears and/or at least one reverse gear may be shifted. Six gear planes are provided such that at least one power shifting winding path gear may be shifted via at least the shift element.

24 Claims, 12 Drawing Sheets

| G | ZS | K1 | K2 | C | D | E | F | G | H | I | J | K | M | N |
|---|---|---|---|---|---|---|---|---|---|---|---|---|---|---|
| G1 | _i3_i4_i2 |  |  | 1 |  |  |  |  |  |  |  |  |  | 1 |
| G2 | _i2 | 1 |  | 1 |  |  |  |  |  |  |  |  |  |  |
| G3 | _i3 | 1 |  |  |  |  |  |  |  |  |  |  |  |  |
| G4 | _i4 |  | 1 |  |  |  |  |  |  | 1 |  |  |  |  |
| G5 | _i5 | 1 |  |  |  | 1 |  |  |  |  |  |  |  |  |
| G6 | _i6 |  | 1 |  |  |  |  | 1 |  |  |  |  |  |  |
| G7 | _i7 | 1 |  |  |  |  |  |  | 1 |  |  |  |  |  |
| G8 | _i8 |  | 1 |  |  |  |  |  |  |  |  | 1 |  |  |
| G9 | _i9 | 1 |  |  |  |  | 1 |  |  |  |  |  |  |  |

R – GEAR

| G | ZS | K1 | K2 | C | D | E | F | G | H | I | J | K | M | N |
|---|---|---|---|---|---|---|---|---|---|---|---|---|---|---|
| R1 | _iR | 1 |  |  | 1 |  |  |  |  |  |  |  |  | 1 |
| R2 | _iR_i2_i4 | 1 |  |  | 1 |  |  |  |  |  |  |  | 1 |  |
| R3 | _i4_i3_iR |  | 1 |  |  |  |  |  |  | 1 |  |  |  | 1 |

OVERDRIVE

| G | ZS | K1 | K2 | C | D | E | F | G | H | I | J | K | M | N |
|---|---|---|---|---|---|---|---|---|---|---|---|---|---|---|
| O1 | _i4_i3_i9 |  | 1 |  |  |  | 1 |  |  |  |  |  |  | 1 |

Fig. 2

| G | ZS | K1 | K2 | B | C | E | F | G | H | I | J | K | N |
|---|---|---|---|---|---|---|---|---|---|---|---|---|---|
| G1 | i_3 i_4 i_2 | 1 | | | 1 | | | | | | | | 1 |
| G2 | i_2 | 1 | 1 | | 1 | | | | | | | | |
| G3 | i_3 | 1 | | | | 1 | | | | | | | |
| G4 | i_4 | 1 | 1 | | | | | | | | 1 | | |
| G5 | i_5 | 1 | | | | 1 | | | | | | | |
| G6 | i_6 | 1 | 1 | | | | | | | 1 | | | |
| G7 | i_7 | 1 | | | | | 1 | | | | | | |
| G8 | i_8 | 1 | 1 | | | | | | 1 | | | | |
| G9 | i_9 | | 1 | | | | | | | | | 1 | | lsb.

R- GEAR

| | | | | | | | | | | | | | |
|---|---|---|---|---|---|---|---|---|---|---|---|---|---|
| R1 | i_R | 1 | 1 | 1 | | | | | | | | | 1 |
| R2 | i_3 i_4 i_R | 1 | | 1 | | | | | | | | 1 | |

OVERDRIVE

| | | | | | | | | | | | | | |
|---|---|---|---|---|---|---|---|---|---|---|---|---|---|
| O1 | i_4 i_3 i_9 | | 1 | | | | | | | | | 1 | 1 | lsb.

Fig. 4

| G | ZS | K1 | K2 | C | D | E | F | G | H | I | J | K | N |
|---|---|---|---|---|---|---|---|---|---|---|---|---|---|
| G1 | i_3·i_4·i_2 | 1 | | | | | | 1 | | | | | 1 |
| G2 | i_2 | | 1 | | | | | 1 | | | | | |
| G3 | i_3 | 1 | | | | | | | | | 1 | | |
| G4 | i_4 | | 1 | | | | | | | 1 | | | |
| G5 | i_5 | 1 | | | 1 | | | | | | | | |
| G6 | i_6 | 1 | 1 | 1 | | | | | | | | | |
| G7 | i_7 | 1 | 1 | | | | | | | | | 1 | |
| G8 | i_8 | 1 | 1 | | | | | | 1 | | | | |
| G9 | i_9 | 1 | 1 | | | 1 | | | | | | | | lsb.

R- GEAR

| | | K1 | | | | | F | | | | | | |
|---|---|---|---|---|---|---|---|---|---|---|---|---|---|
| R1 | i_R | 1 | | | | | 1 | | | | | | |

OVERDRIVE

| | | | K2 | | | E | | | | | | | N |
|---|---|---|---|---|---|---|---|---|---|---|---|---|---|
| O1 | i_4·i_3·i_9 | | 1 | | | 1 | | | | | | | 1 | lsb.

Fig.6

| G | ZS | K1 | K2 | A | C | D | E | F | G | H | I | K | M | N |
|---|---|---|---|---|---|---|---|---|---|---|---|---|---|---|
| G1 | ZW1i_6i_2 | 1 |  |  |  |  |  |  |  |  |  |  |  | 1 |
| G2 | i_2 |  | 1 |  |  |  |  |  | 1 |  |  |  |  |  |
| G3 | i_3 | 1 |  |  |  |  |  |  | 1 |  |  |  |  |  |
| G4 | i_4 |  | 1 |  | 1 |  |  |  |  |  |  |  |  |  |
| G5 | i_5 | 1 |  |  |  | 1 |  |  |  |  |  |  |  |  |
| G6 | i_6 |  | 1 |  |  |  | 1 |  |  |  |  |  |  |  |
| G7 | i_7 | 1 |  |  |  |  |  |  |  | 1 |  |  |  |  |
| G8 | i_8 |  | 1 |  |  |  |  |  |  |  |  | 1 |  |  |
| G9 | i_9 | 1 |  |  |  |  |  | 1 |  |  |  |  |  |  | 1sb. |

R- GEAR

| G | ZS | K1 | K2 | A | C | D | E | F | G | H | I | K | M | N |
|---|---|---|---|---|---|---|---|---|---|---|---|---|---|---|
| R1 | i_R |  |  | 1 |  |  |  |  |  |  |  |  |  |  |
| R2 | i_3i_4i_R | 1 |  | 1 |  |  |  |  |  |  |  |  | 1 |  |
| R3 | ZW1i_6i_R | 1 |  | 1 |  |  |  |  |  |  |  |  |  | 1 |

OVERDRIVE

| G | ZS | K1 | K2 | A | C | D | E | F | G | H | I | K | M | N |
|---|---|---|---|---|---|---|---|---|---|---|---|---|---|---|
| O1 | i_4i_3i_9 | 1 |  |  |  |  |  | 1 |  |  |  |  | 1 | 1 | 1sb. |
| O2 | i_6ZW1i_7 | 1 |  |  |  |  |  |  |  |  |  | 1 |  | 1 | 1sb. |
| O3 | i_6ZW1i_9 | 1 |  |  |  |  |  | 1 |  |  |  |  |  | 1 |

| G | ZS | K1 | K2 | A | C | D | E | F | G | H | I | K | M | N |
|---|---|---|---|---|---|---|---|---|---|---|---|---|---|---|
| G1 | ZW1 i_6 i_2 | 1 | | | | | | | 1 | | | | | 1 |
| G2 | i_2 | | 1 | | | | | | 1 | | | | | |
| G3 | i_3 | 1 | | | | 1 | | | | | | | | |
| G4 | i_4 | | 1 | | 1 | | | | | | | | | |
| G5 | i_5 | 1 | | | | | 1 | | | | | | | |
| G6 | i_6 | | 1 | | | | | | | | 1 | | | |
| G7 | i_7 | 1 | | | | | | 1 | | | | | | |
| G8 | i_8 | | 1 | | | | | | | 1 | | | | |
| G9 | i_9 | 1 | | | | | | | | | | 1 | | lsb. |

R-GEAR

| | ZS | K1 | K2 | A | C | D | E | F | G | H | I | K | M | N |
|---|---|---|---|---|---|---|---|---|---|---|---|---|---|---|
| R1 | i_R | | | 1 | | | | | | | | | | |
| R2 | i_3 i_4 i_R | 1 | 1 | 1 | | | | | | | | | 1 | |
| R3 | ZW1 i_6 i_R | 1 | 1 | 1 | | | | | | | | | | 1 |

OVERDRIVE

| | ZS | K1 | K2 | A | C | D | E | F | G | H | I | K | M | N |
|---|---|---|---|---|---|---|---|---|---|---|---|---|---|---|
| O1 | i_4 i_3 i_7 | | 1 | | | | | 1 | | | | | 1 | |
| O2 | i_4 i_3 i_9 | | 1 | | | | | | | | | | 1 | 1 |
| O3 | i_6 ZW1 i_9 | | 1 | | | | | | | | | 1 | | 1 lsb. |
| O4 | i_6 ZW1 i_7 | | 1 | | | | | 1 | | | | | | 1 lsb. |

| G | ZS | K1 | K2 | A | C | D | E | F | G | H | I | K | M | N |
|---|---|---|---|---|---|---|---|---|---|---|---|---|---|---|
| G1 | ZW_1_i_8_i_2 | 1 | | | | | | | | | | | | 1 |
| G2 | _i_2 | 1 | 1 | | | | | | | | | | | |
| G3 | _i_3 | 1 | | | | 1 | | | | | | | | |
| G4 | _i_4 | 1 | 1 | | 1 | | | | | | | | | |
| G5 | _i_5 | 1 | 1 | | | | 1 | | | | | | | |
| G6 | _i_6 | | 1 | | | | | | 1 | 1 | | | | |
| G7 | _i_7 | 1 | | | | | | 1 | | | | | | |
| G8 | _i_8 | | 1 | | | | | | | | 1 | | | |
| G9 | _i_9 | 1 | | | | | | | | | | 1 | | | lsb.

R-GEAR

| | | K1 | K2 | A | C | D | E | F | G | H | I | K | M | N |
|---|---|---|---|---|---|---|---|---|---|---|---|---|---|---|
| R1 | _i_R | 1 | | 1 | | | | | | | | | | |
| R2 | _i_3_i_4_i_R | 1 | | 1 | | | | | | | | | 1 | |
| R3 | ZW_1_i_8_i_R | 1 | | 1 | | | | | | | | | | 1 |

OVERDRIVE

| | | K1 | K2 | A | C | D | E | F | G | H | I | K | M | N |
|---|---|---|---|---|---|---|---|---|---|---|---|---|---|---|
| O1 | _i_4_i_3_i_9 | | 1 | | | | | | | | | 1 | | |
| O2 | _i_8_ZW_1_i_9 | | 1 | | | | | | | | | 1 | 1 | 1 | lsb.
lsb.

Fig. 12

DOUBLE CLUTCH TRANSMISSION

This application claims priority from German patent application serial no. 10 2009 002 345.3 filed Apr. 13, 2010.

FIELD OF THE INVENTION

The present invention relates to a double clutch transmission.

BACKGROUND OF THE INVENTION

A six or seven gear double clutch transmission is known from the published patent DE 103 05 241 A1. The double clutch transmission comprises two clutches, which are each connected to the driveshaft, at the input sides thereof, and to one of the two transmission input shafts, at the output sides thereof. The two transmission input shafts are disposed coaxially to each other. Further, two countershafts are disposed axially parallel to the two transmission input shafts, the idler gears of which are meshing with the fixed gears of the transmission input shafts. Furthermore, coupling devices are pivot-supported in an axially displaceable manner on the countershafts in order to be able to switch the respective toothed gearwheels. The respectively selected transmission ratio is transferred to a differential via the output gears. In order to realize the desired transmission ratio steps in the known double clutch transmission, a plurality of gear planes such that a significant amount of construction space is required during installation.

Furthermore, a spur gear change transmission is known from the published patent DE 38 22 330 A1. The spur gear change transmission comprises a double clutch that can be switched under load, the one part of which is connected to a driveshaft, and the other part of which is connected to a hollow driveshaft that is pivot-supported on the driveshaft. For certain transmission ratios, the driveshaft may be coupled to the hollow driveshaft via a shift element.

A power-shift transmission having two clutches is known from the published patent DE 10 2004 001 961 A1, which are each associated with a subtransmission. The transmission input shafts of both subtransmissions are disposed coaxially to each other and engage into idler gears of the associated countershafts via fixed gears. The respective idler gears of the countershafts may be connected to the respective countershaft by means of associated shift elements in a rotationally fixed manner. An eight-shift transmission is known from said published patent, wherein a further shift element is provided for coupling the two transmission input shafts in order to realize a further transmission ratio step. In order to be able to realize the transmission ratio steps, the eight-shift transmission in this embodiment already requires at least six gear planes in both subtransmissions. This leads to an undesired elongation of the construction length in an axial direction such that the possibility of an installation into a vehicle is substantially limited.

A further power-shift transmission is also known from the published patent DE 10 2005 028 532 A1, which comprises two input shafts and only one countershaft. For example, a nine-shift transmission in this embodiment requires at least seven gear planes in order to be able to realize the transmission ratio steps. This leads to an undesired elongation of the construction length in an axial direction. Furthermore, an additional shaft, having a gear plane, is required in order to realize the reverse transmission ratios, which comprises a shift element and two toothed gears. A further disadvantage arises, in the known power-shift transmission, in that power shifts are possible only between the first and the second gears.

SUMMARY OF THE INVENTION

The present invention is therefore based on the object of providing a double clutch transmission of the type described above, wherein a plurality of power shifting translation ratio steps can be realized in a manner that is as cost effective as possible, with as few components as possible, and at a small required construction space.

Accordingly, a double clutch transmission optimized in terms of construction size is provided, comprising two clutches, the input sides of which are connected to a driveshaft and the output sides of which are connected to one of two transmission input shafts that are disposed, for example, coaxially to each other. The double clutch transmission comprises at least two countershafts or the like, on which toothed gearwheels, embodied as idler gears, are pivot-supported, wherein toothed gearwheels embodied as fixed gears and disposed on the transmission input shafts in a rotationally fixed manner are provided, which at least partially engage into the idler gears. Furthermore, a plurality of coupling devices is provided for the rotationally fixed connection of an idler gear to the countershaft. The double clutch transmission, according to the invention, comprises an output gear or a constant pinion, respectively, provided on each of the countershafts, which is coupled to a gearing of a driveshaft in order to connect the respective countershaft to the drive, and at least one actuatable, or engageable shift element or the like as a so-called winding path gear shift element for the rotationally fixed connection of two toothed gearwheels, wherein a plurality of power-shifting forward gears and at least one power-shifting reverse gear may be shifted.

According to the invention, provided the double clutch transmission preferably comprises only six gear planes, by means of which at least nine power shifting forward gears are realized at a small required construction space.

For example, the six gear planes may be formed by at least three dual gear planes and, for example, a maximum of three single gear planes, wherein in each dual gear plane one idler gear of the first and the second countershafts is associated with one fixed gear of one of the transmission input shafts, and at least one idler gear may be utilized for at least two gears such that at least one power shifting winding path gear may be shifted via one shift element. Due to the possible multiple uses of the idler gears, a maximum number of transmission ratios may be realized in the double clutch transmission provided with as few gear planes as possible, wherein preferably all forward gears and at least one reverse gear may be power shifted in sequential order.

In order to optimize the graduation in the double clutch transmission provided according to the invention, a further dual gear plane may, for example, also be replaced with two single gear planes, in that a fixed gear is replaced with two fixed gears. In this manner, a particularly harmonic progressive gear graduation may be achieved. It is also possible to replace two single gear planes with one dual gear plane.

The double clutch transmission provided may preferably be embodied as a 9-gear transmission having at least nine power shifted gear steps. Due to the short construction, as opposed to known transmission arrangements, the double clutch transmission is particularly suited for a front lateral construction in a vehicle. However, other types of constructions are also possible depending on the type and construction space situation of the vehicle in question.

Preferably the provided first forward gear in the double clutch transmission may be a winding path gear. Accordingly, the first power shifting gear is a winding path gear. Furthermore, at least one reverse gear and/or further gears, such as overdrive gears, may also be embodied as a winding path gear. Reverse gear may partially also be configured in a power shifting manner to each other.

For example, depending on the construction, four to five shifting idler gears may be associated with the first countershaft, and five shifting idler gears may be associated with the second countershaft, wherein each are meshing with fixed gears of the associated transmission input shaft.

If the last or next to last gear step is configured to be higher than the respective gear positioned before the same, a particularly high output torque or drive power may be provided in case of a reverse shifting required by the driver.

Advantageously, a maximum of six shift points are required at each countershaft in the double clutch transmission according to the invention. In total only ten shift points are utilized on both countershafts in order to realize the recommended gear steps.

Within the course of a possible variant embodiment, the invention may provide that the double clutch transmission also comprises four dual gear planes such that accordingly only two single gear planes are provided in order to realize the total of six gear planes. Other constellations are also possible.

The invention may further provide that the idler gear of the second subtransmission can be connected to the idler gear of the first subtransmission at the second countershaft via at least one shift element, wherein the first forward gear and/or one reverse gear and at least one overdrive gear may be shifted as the winding path gear.

It may further be provided that the idler gear of the second subtransmission can be connected to the idler gear of the first subtransmission, via an alternative or additional shift element at the first countershaft, such that at least one reverse gear and/or at least one overdrive gear may be shifted as the winding path gear via the shift element.

Therefore, winding path gears may be realized via the at least one shift element with the use of the double clutch transmission according to the invention, wherein toothed gear wheels of both subtransmissions are coupled to each other in order to thereby realize a flow of power through both subtransmissions. For this purpose, the respectively utilized shift element serves for coupling two idler gears, thus bringing the transmission input shafts to be dependent upon one another.

In the double clutch transmission, the arrangement of the shift elements may be varied for coupling two certain idler gears such that the shift elements do not mandatorily need to be disposed between the idler gears to be coupled. Accordingly, other arrangement positions of the respective shift element are also conceivable in order to optimize, for example, the connection to an actuator system.

According to a possible embodiment, it may be provided in the double clutch transmission that the first gear plane and the second gear plane each as a single gear plane, and the third gear plane as the dual gear plane comprise fixed gears at the second transmission input shaft of the second subtransmission, wherein the fourth gear plane and the fifth gear plane, each as dual gear planes, and the sixth gear plane, as a single gear plane, comprise three fixed gears at the first transmission input shaft of the first subtransmission. For this purpose it is possible that the second gear plane could also be configured as the dual gear plane, and that the fourth gear plane could also be configured as the single gear plane.

Within the scope of a further variant embodiment of the invention it may also be provided that in the double clutch transmission the first gear plane as the dual gear plane and the second gear plane as the single gear plane, and the third gear plane again as the dual gear plane comprise three fixed gears on the second transmission input shaft of the second subtransmission, wherein the fourth gear plane and the fifth gear plane each as the dual gear plane, and the sixth gear plane as the single gear plane may comprise three fixed gears of the first transmission input shaft of the first subtransmission.

In order to provide the rotation reversal required for realizing reverse gears in the double clutch transmission according to the invention, at least one intermediate gear or the like may be utilized, for example, which is disposed, for example, on an intermediate shaft. It is also possible that one of the idler gears of a countershaft serves as the intermediate gear for at least one reverse gear. No additional intermediate shaft is necessary for the reverse gear transmission ratio in this case, since one of the idler gears meshes both with a fixed gear and with a further shiftable idler gear of the other countershaft. In this manner, the intermediate gear required for the reverse gear is disposed on a countershaft as a shiftable idler gear and further serves for realizing at least one further forward gear. The intermediate gear may also be configured as a stepped gear, regardless of whether the same is disposed on the countershaft or on an additional intermediate shaft. It is also possible that the intermediate gear is not disposed on an already existing countershaft, but is provided, for example, on a further separate shaft, such as a third countershaft.

In order to obtain the desired transmission ratio step it may be provided in the double clutch transmission, according to the invention, that at least one bidirectionally operative coupling device or the like is disposed on each countershaft. The provided coupling devices may each connect an associated idler gear to the countershaft in a rotationally fixed manner in the activated or engaged state, depending on the actuating direction. Furthermore, a unidirectionally operative coupling device or the like may also be disposed on at least one of the countershafts. As the coupling devices, for example, hydraulically, electrically, pneumatically, mechanically actuated clutches or also positive-locking jaw clutches, as well as any type of synchronizations may be utilized, which serve for the rotationally fixed connection of an idler gear to a countershaft. It is possible that a bidirectionally operative coupling device is replaced with two unidirectionally operative coupling devices, or vice versa.

It is conceivable that the arrangement possibilities of the toothed gearwheels states may be varied, and the number of toothed gearwheels and the number of coupling devices may be changed in order to realize even further power-shift or non-power-shift gears as well as construction and component savings in the double clutch transmission provided. In particular, fixed gears of the dual gear planes may be divided into two fixed gears for two single gear planes. Any step changes may be improved in this manner. It is further also possible to exchange the countershafts. The subtransmissions may also be exchanged, i.e., the same are mirrored about a vertical axis. For this purpose, the hollow and solid shafts are exchanged. In this manner it is possible, for example, to dispose the smallest toothed gear on the solid shaft in order to further optimize the utilization of the existing construction space. Furthermore, adjacent gear planes may also be exchanged, for example, in order to optimize shaft deflection and/or to optimally connect a shift actuating system. Furthermore, the respective arrangement position of the coupling devices to the gear plane may be varied. The effective direction of the coupling devices may further also be changed.

The gear numerations were defined freely. It is also possible to add a crawler, or crawler gear and/or an overdrive or overdrive gear in order to the terrain properties or the acceleration behavior in a vehicle improve, for example. Furthermore, for example, a first gear may be omitted, i.e., in order to better optimize the totality of the step changes. The gear numeration varies accordingly with these measures.

Regardless of the respective variant embodiments of the double clutch transmission, the driveshaft and the output shaft may preferably also not be disposed coaxially to each other, which realizes a particularly construction space saving arrangement. For example, the shafts thereby spatially disposed in a successive manner may also be positioned at a slight offset to each other. In this arrangement a direct gear with transmission ratio one may be realized via gear engagement and may be positioned advantageously into the sixth to ninth gear in a relatively free manner. Other arrangement possibilities of the driveshaft and of the output shaft are also conceivable.

Preferably, the provided double clutch transmission is equipped with an integrated output step. The output step may comprise a fixed gear on the driveshaft as the output gear, which is engaged both in a first output gear as the fixed gear of the first countershaft and in a second output gear as the fixed gear of the second countershaft. However, it is possible that at least one of the output gears is embodied as a shifting toothed gear.

Advantageously the lower forward gears and the reverse gears may be actuated via a starting or shifting clutch in order to thereby concentrate higher loads to said clutch and thereby be able to embody the second clutch in a more construction space and cost-effective manner. In particular, the gear planes may be disposed in the provided double clutch transmission such that startup can be achieved both via the internal transmission input shaft or also via the exterior transmission input shaft, and thereby via the respectively better suitable clutch, which is also enabled in a construction of the double clutch transmission that is concentrically disposed and nestled. For this purpose, the gear planes may be disposed or exchanged in a respective mirror inverted manner.

Regardless of the respective variant embodiment, the gear planes provided in the double clutch transmission may be interchanged, for example. It is also possible that two single gear planes are utilized instead of a dual gear plane and/or vice versa.

BRIEF DESCRIPTION OF THE DRAWINGS

The present invention is explained in further detail below based on the drawings. They show:

FIG. 2 a shift pattern of the first variant embodiment according to FIG. 1;

FIG. 4 a shift pattern of the second variant embodiment according to FIG. 3;

FIG. 6 a shift pattern of the third variant embodiment according to FIG. 5;

FIG. 8 a shift pattern of the fourth variant embodiment according to FIG. 7;

FIG. 10 a shift pattern of the fifth variant embodiment according to FIG. 9;

FIG. 12 a shift pattern of the sixth variant embodiment according to FIG. 11.

DETAILED DESCRIPTION OF THE PREFERRED EMBODIMENTS

Figure 1:
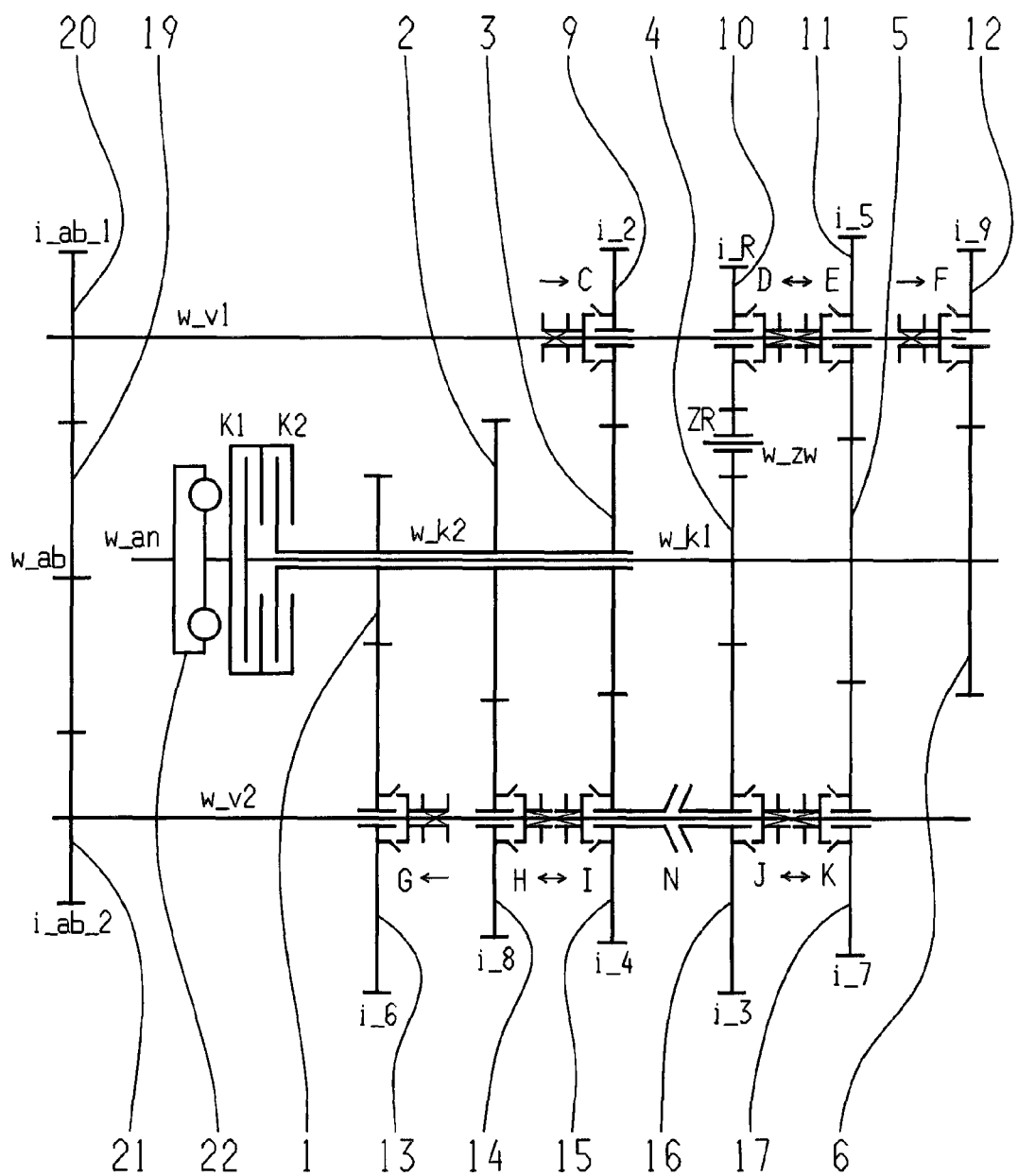
FIG. 1 a schematic view of a first variant embodiment of a nine-gear double clutch transmission according to the invention.

FIGS. 1, 3, 5, 7, 9 and 11 each show a possible variant embodiment of a nine-gear double clutch transmission. The respective shift patterns for the variant embodiments are illustrated, in table format, in FIGS. 2, 4, 6, 8, 10 and 12.

The nine-gear double clutch transmission comprises two clutches K1, K2, the input sides of which are connected to a driveshaft w_an, and the output sides of which are connected to one of two transmission input shafts w_k1, w_k2 that are disposed coaxially to each other. Furthermore, a torsion vibration damper 22 may be disposed on the driveshaft w_an. Further, two countershafts w_v1, w_v2 are provided, on which toothed gearwheels embodied as idler gears 7, 8, 9, 10, 11, 12, 13, 14, 15, 16, 17 are disposed in a rotationally fixed manner. Toothed gearwheels embodied as fixed gears 1, 2, 3, 4, 5, 6, are disposed on the two transmission input shafts w_k1, w_k2 in a rotationally fixed manner, which at least partially engage into the idler gears 7, 8, 9, 10, 11, 12, 13, 14, 15, 16, 17.

In order to be able to connect the idler gears 7, 8, 9, 10, 11, 12, 13, 14, 15, 16, 17 to the respective countershaft w_v1, w_v2, a plurality of actuatable coupling devices A, B, C, D, E, F, G, H, I, J, K are provided on the countershafts w_v1, w_v2. Furthermore, output gears 20, 21 are disposed on both countershafts w_v1, w_v2 as constant pinions, which are each coupled to a gearing of a fixed gear 19 of an output shaft w_ab.

In addition to the coupling devices A, B, C, D, E, F, G, H, I, J, K, which realize a rotationally fixed connection between a toothed gearwheel and the associated countershaft w_v1, w_v2, at least one winding path gear shift element M, N is provided in the double clutch transmission for the rotationally fixed connection of two toothed gearwheels of one countershaft w_v1, w_v2 such that at least one winding path gear is realized.

According to the invention only six gear planes are provided in the double clutch transmission, wherein in each variant embodiment at least three dual gear planes 7-13, 8-14, 9-15, 10-16, 11-17, and a maximum of three single gear planes 1-13, 2-14, 4-16, 12-6 are provided such that a total of six gear planes are realized. In this manner, at least one power shifting winding path gear can be shifted via at least one actuated shift element M, N. As the shift element M, N, for example, a jaw or the like may be utilized for connecting two toothed gears or the like.

In all variant embodiments of the invention, the shift element N is disposed on the second countershaft w_v2 in order to be able to connect the idler gear 15 to the idler gear 16 when the shift element N is actuated. Preferably, in one or more variant embodiments, an additional shift element M may be provided on the first countershaft w_v1 in order to realize further winding path gears. The idler gears 9 and 10 may be connected to each other in a rotationally fixed manner using the actuated shift element M.

In the first, second, and third variant embodiments according to FIGS. 1 to 6, the fixed gear 1 of the second transmission input shaft $w\_k2$ meshes in the first gear plane as a single gear plane 1-13 with the idler gear 13 of the second countershaft $w\_v2$. In the second gear plane, as a single gear plane 2-14, the fixed gear 2 of the second transmission input shaft $w\_k2$ is engaged in the idler gear 14 of the second countershaft $w\_v2$ in the first and third variant embodiments, wherein in the second variant embodiment the fixed gear 2 is engaged both in the idler gear 14 of the second countershaft $w\_v2$ and in the intermediate gear ZR on an intermediate shaft $w\_zw$ for the rotation reversal in order to realize reverse gear transmission ratios. The intermediate gear ZR further meshes with the idler gear 8 of the first countershaft $w\_v1$. In the third gear plane 9-15, as the dual gear plane, the fixed gear 3 of the second transmission input shaft $w\_k2$ is engaged both in the idler gear 15 of the second countershaft $w\_v2$ and in the idler gear 9 of the first countershaft $w\_v1$ in the first to third variant embodiments.

In the first variant embodiment, the fixed gear 4 of the first transmission input shaft $w\_k1$ is engaged both in the intermediate gear ZR for the rotation reversal, for realizing reverse gear transmission ratios, and in an idler gear 16 of the second countershaft $w\_v2$, in the fourth gear plane, as the dual gear plane 10-16. The intermediate gear ZR further meshes with the idler gear 10 of the first countershaft $w\_v1$. According to the second variant embodiment, the fixed gear 4 of the first transmission input shaft $w\_k1$ is engaged in the idler gear 16 of the second countershaft $w\_v2$ in the fourth gear plane 4-16, as the single gear plane. In the third variant embodiment, according to FIG. 5, the fixed gear 4 of the first transmission input shaft $w\_k1$ meshes both with the idler gear 16 of the second countershaft $w\_v2$ and with the idler gear 10 of the first countershaft $w\_v1$ in the fourth gear plane 10-16, as the dual gear plane.

In the first to third variant embodiments the fixed gear 5 of the first transmission input shaft $w\_k1$ meshes both with the idler gear 11 of the first countershaft $w\_v1$ and with the idler gear 17 of the second countershaft $w\_v2$ in the fifth gear plane 11-17, as the dual gear plane. According to the first and second variant embodiments, the fixed gear 6 of the first transmission input shaft $w\_k1$ is engaged in the idler gear 12 of the first countershaft $w\_v1$ in the sixth gear plane 12-6, as the single gear plane. In the third variant embodiment, the fixed gear 6 of the first transmission input shaft $w\_k1$ is engaged in the intermediate gear ZR which, in turn, meshes with the idler gear 12 of the first countershaft $w\_v1$.

According to the fourth, fifth and sixth variant embodiments, according to FIGS. 7 to 12, the fixed gear 1 of the second transmission input shaft $w\_k2$ is engaged both in the idler gear 13 of the second countershaft $w\_v2$ and in the intermediate gear ZR for the rotation reversal, in order to realize reverse gear transmission ratios, in the first gear plane 7-13 as the dual gear plane. The intermediate gear ZR, in turn, is engaged in the idler gear 7 of the first countershaft $w\_v1$. In the second gear plane 2-14, as the single gear plane, the fixed gear 2 of the second transmission input shaft $w\_k2$ is only engaged in the idler gear 14 of the second countershaft $w\_v2$. In the third gear plane 9-15, as the dual gear plane, the fixed gear 3 of the second transmission input shaft $w\_k2$ meshes both with the idler gear 9 of the first countershaft $w\_v1$ and with the idler gear 15 of the second countershaft $w\_v2$. Furthermore, the fixed gear 4 of the first transmission input shaft $w\_k1$ is engaged both in the idler gear 10 of the first countershaft $w\_v1$ and in the idler gear 16 of the second countershaft $w\_v2$ in the fourth gear plane 10-16, as the dual gear plane. In the fifth gear plane 11-17, as the dual gear plane, the fixed gear 5 of the first transmission input shaft $w\_k1$ meshes both with the idler gear 11 of the first countershaft $w\_v1$ and with the idler gear 17 of the second countershaft $w\_v2$. Finally, in the sixth gear plane 12-6, as the single gear plane, the fixed gear 6 of the first transmission input shaft $w\_k1$ is engaged in the idler gear 12 of the first countershaft $w\_v1$.

In all variant embodiments, a unidirectionally operative coupling device G is provided on the second countershaft $w\_v2$ between the first gear plane 1-13 or 7-13 and the second gear plane 2-14 or 8-14, by means of which the idler gear 13 is firmly connected to the second countershaft $w\_v2$, when the coupling device G is actuated.

In the first, second and third variant embodiment, a bidirectionally operative coupling device H-I is provided on the second countershaft $w\_v2$, between the second gear plane 2-14 or 8-14 and the third gear plane 9-15. When the coupling device H is actuated, the idler gear 14 may be firmly connected to the second countershaft $w\_v2$. However, when the coupling device I is actuated, the idler gear 15 may be firmly connected to the second countershaft $w\_v2$. Finally, a bidirectionally operative coupling device J-K is also provided between the fourth gear plane 10-16 or 4-16 and the fifth gear plane 11-17. When the coupling device J is actuated, the idler gear 16 is firmly connected to the second countershaft $w\_v2$, and when the coupling device K is actuated the idler gear 17 is firmly connected to the second countershaft $w\_v2$.

Figure 5:
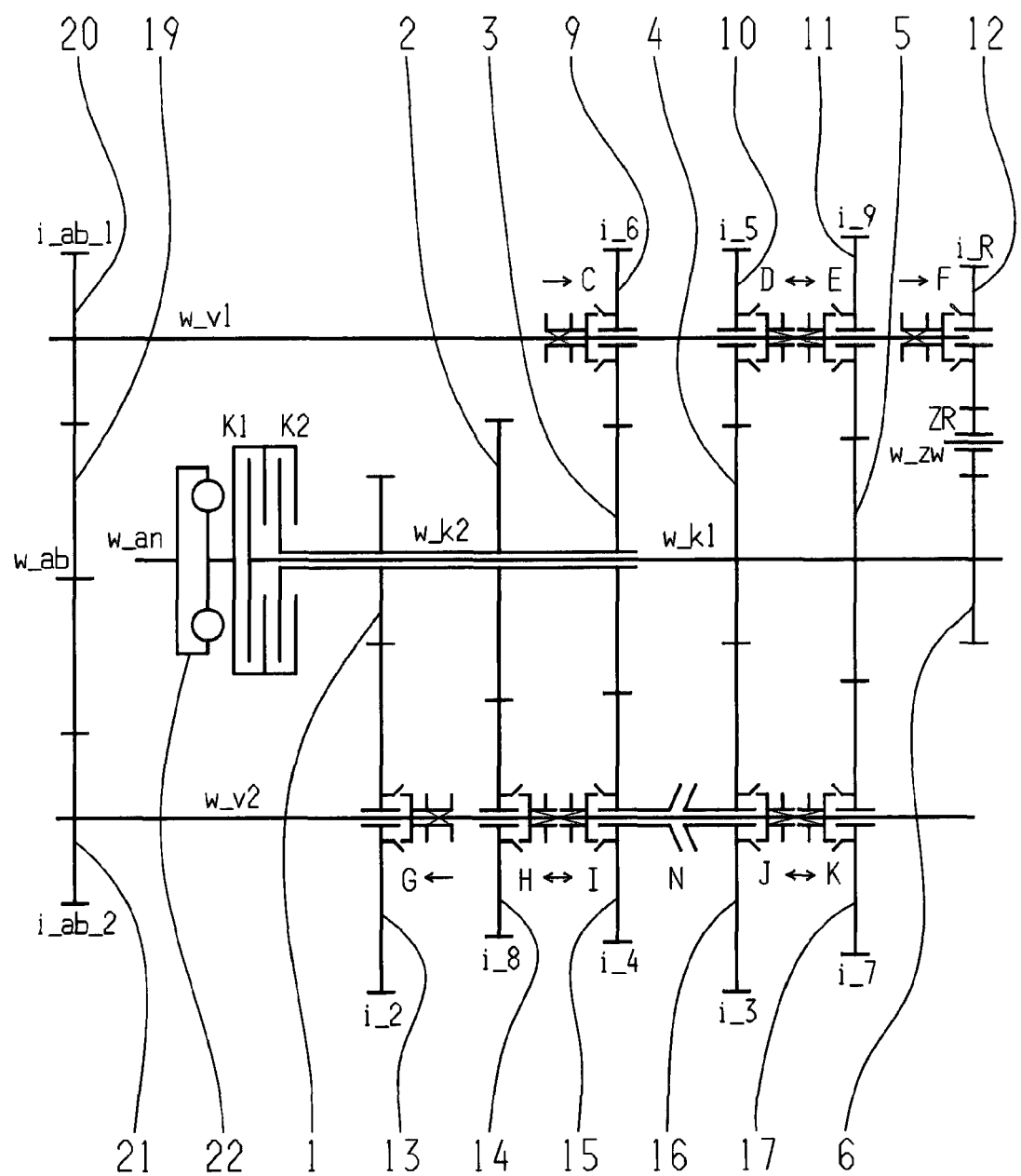
FIG. 5 a schematic view of a third variant embodiment of the nine-gear double clutch transmission according to the invention.

In the first and third variant embodiment according to FIGS. 1 and 5, a unidirectionally operative coupling device C is associated with the third gear plane 9-15 on the first countershaft $w\_v1$. When the coupling device C is actuated, the idler gear 9 is firmly connected to the first countershaft $w\_v1$. Furthermore, a bidirectionally operative coupling device D-E is provided between the fourth gear plane 10-16 and the fifth gear plane 11-17. When the coupling device D is actuated, the idler gear 10 is firmly connected to the first countershaft $w\_v1$, and when the coupling device E is actuated, the idler gear 11 is firmly connected to the first countershaft $w\_v1$. Also, a unidirectionally operative coupling device F is associated with the first to third variant embodiments of the sixth gear plane 12-6, which firmly connects the idler gear 12 to the first countershaft in the actuated state.

Figure 3:
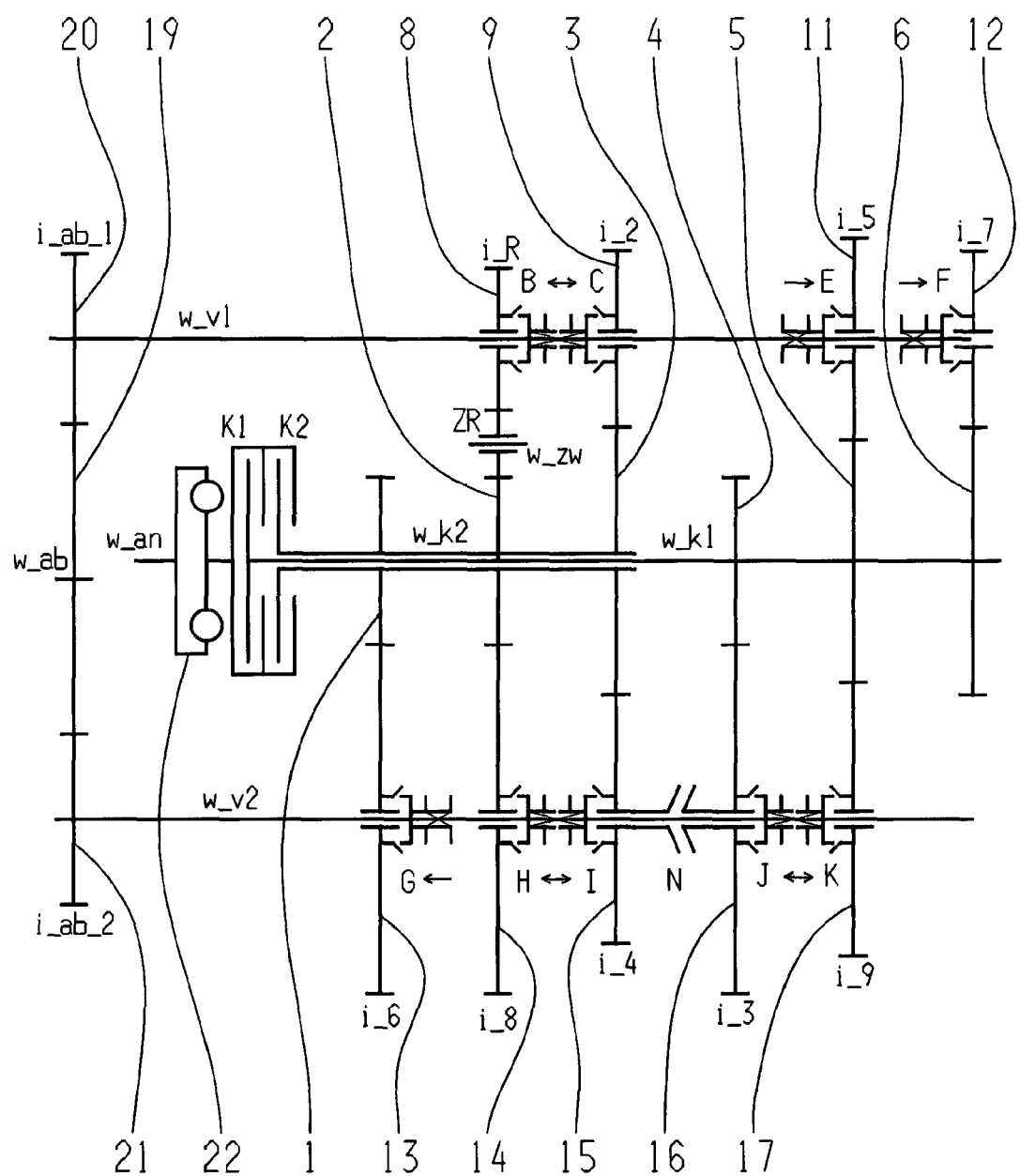
FIG. 3 a schematic view of a second variant embodiment of the nine-gear double clutch transmission according to the invention.

In the second variant embodiment according to FIG. 3, a bidirectionally operative coupling device B-C is provided between the second gear plane 8-14 and the third gear plane 9-15. When the coupling device B is actuated, the idler gear 8 is firmly connected to the first countershaft $w\_v1$, and when the coupling device C is actuated, the idler gear 9 is firmly connected to the first countershaft $w\_v1$. Furthermore, a unidirectionally operative coupling device E is associated with the gear plane 11-17, which firmly connects the idler gear 11 to the first countershaft $w\_v1$ in the actuated state.

In the fourth, fifth and sixth variant embodiments according to FIGS. 7 to 12, a unidirectionally operative coupling device A is associated with the first gear plane 7-13, on the first countershaft $w\_v1$, which firmly connects the idler gear 7 to the first countershaft $w\_v1$ in the actuated state. A further unidirectionally operative coupling device C or F is associated with the third gear plane 9-15 and with the sixth gear plane 12-6, wherein the coupling device C firmly connects the idler gear 9 to the first countershaft $w\_v1$ in the actuated state, and wherein the coupling device F firmly connects the idler gear 12 to the first countershaft $w\_v1$ in the actuated state. Finally, a bidirectionally operative coupling device D-E is provided, between the fourth gear plane 10-16 and the fifth gear plane 11-17, wherein the coupling device D firmly connects the idler gear 10 to the first countershaft w_v1 in the actuated state, and wherein the coupling device E firmly connects the idler gear 11 to the first countershaft w_v1 in the actuated state. Finally, a bidirectionally operative coupling device H-I is associated with the second countershaft w_v2 between the second gear plane 2-14 and the third gear plane 9-15, wherein the coupling device H firmly connects the idler gear 14 to the second countershaft w_v2 in the actuated state, and the coupling device I firmly connects the idler gear 15 to the second countershaft w_v2 in the actuated state. Finally, a unidirectionally operative coupling device K is associated with the firth gear plane 11-17, which firmly connects the idler gear 17 to the second countershaft w_v2 in the actuated state.

An integrated output stage comprising the output gear 20 that is connected to the first countershaft w_v1 in a rotationally fixed manner, and comprising the output gear 21, which is disposed on the second countershaft w_v2, may be provided in the double clutch transmission according to the invention. The output gear 20 and the output gear 21 each mesh with a fixed gear 19 of the power take-off shaft w_ab. However, it is also possible that a shifting connection is realized between the output gear 20 or 21 and the associated countershaft w_v1 or w_v2.

Regardless of the respective variant embodiments, the double clutch transmission is such that at least the forward gears G1 to G9 may be configured in a power shifting manner. Depending on the variant embodiment, reverse gears and/or overdrive gears may also be configured in a power shifting manner, for example, as winding path gears. The details of each variant embodiment are obvious from the shift patterns described below.

The table illustrated in FIG. 2 shows, by way of example, a shift pattern for the first variant embodiment of the nine-gear double clutch transmission according to FIG. 1.

It is obvious from the shift pattern that the first forward gear G1 may be shifted via the first clutch K1 and via the actuated coupling device C as well as via the actuated shift element N as the winding path gear, that the second forward gear G2 may be shifted via the second clutch K2 and via the actuated coupling device C, that the third forward gear G3 may be shifted via the first clutch K1 and via the actuated coupling device J, that the fourth forward gear G4 may be shifted via the second clutch K2 and via the actuated coupling device I, that the fifth forward gear G5 may be shifted via the first clutch K1 and via the actuated coupling device E, that the sixth forward gear G6 may be shifted via the second clutch K2 and via the actuated coupling device G, that the seventh forward gear G7 may be shifted via the first clutch K1 and via the actuated coupling device K, that the eighth forward gear G8 may be shifted via the second clutch K2 and via the actuated coupling device H, and that the ninth forward gear G9 may be shifted via the first clutch K1 and via the actuated coupling device F.

In the first variant embodiment, it is further obvious from the table illustrated in FIG. 2 that a reverse gear R1 may be shifted via the first clutch K1 and via the actuated coupling device D. A subsequent reverse gear R2 may be shifted via the first clutch K1 and via the actuated coupling device I and via the actuated shift element M as the winding path gear. Furthermore, for example, a further reverse gear R3 may be shifted via the second clutch K2 and via the actuated coupling device D and via an actuated shift element N as the winding path gear. Advantageously, the reverse gear R3 may be configured as the winding path gear in a power shifting manner to the first reverse gear R1.

Furthermore, an overdrive gear O1 may be shifted as the winding path gear via the second clutch K2, via the actuated coupling device F, and via the actuated shift element N in the double clutch transmission provided according to the first variant embodiment. Advantageously, shifting may be carried out under load, e.g., without any traction force interruption between the overdrive gear O1 and the ninth forward gear G9.

The table illustrated in FIG. 4 shows, by way of example, a shift pattern for the second variant embodiment of the nine-gear double clutch transmission according to FIG. 3.

The shift pattern shows that the first forward gear G1 may be shifted via the first clutch K1 and via the actuated coupling device C as well as via the actuated shift element N, as the winding path gear, that the second forward gear G2 may be shifted via the second clutch K2 and via the actuated coupling device C, that the third forward gear G3 may be shifted via the first clutch K1 and via the actuated coupling device J, that the fourth forward gear G4 may be shifted via the second clutch K2 and via the actuated coupling device I, that the fifth forward gear G5 may be shifted via the first clutch K1 and via the actuated coupling device E, that the sixth forward gear G6 may be shifted via the second clutch K2 and via the actuated coupling device G, that the seventh forward gear G7 may be shifted via the first clutch K1 and via the actuated coupling device F, that the eighth forward gear G8 may be shifted via the second clutch K2 and via the actuated coupling device H, and that the ninth forward gear G9 may be carried out via the first clutch K1 and via the actuated coupling device K.

In the second variant embodiment, it is further obvious from the table illustrated in FIG. 4 that a reverse gear R1 may be shifted via the second clutch K2 and via the actuated coupling device B. Furthermore, a further reverse gear R2 may be shifted, for example, via the first clutch K1 and via the actuated coupling device B as well as via the actuated shift element N as the winding path gear. Advantageously, the reverse gear R1 may be configured in a power shifting manner to the first reverse gear R1.

Furthermore, an overdrive gear O1 may be shifted as the winding path gear via the second clutch K2 and via the actuated coupling device K as well as via the actuated shift element N. The overdrive gear O1 may be configured, for example, in a power shifting manner to the ninth forward gear G9.

The table illustrated in FIG. 6 shows, by way of example, a shift pattern for the third variant embodiment of the nine-gear double clutch transmission according to FIG. 5.

The shift pattern shows that the first forward gear G1 may be shifted via the first clutch K1 and via the actuated coupling device G as well as via the actuated shift element N as the winding path gear, that the second forward gear G2 may be shifted via the second clutch K2 and via the actuated coupling device G, that the third forward gear G3 may be shifted via the first clutch K1 and via the actuated coupling device J, that the fourth forward gear G4 may be shifted via the second clutch K2 and via the actuated coupling device I, that the fifth forward gear G5 may be shifted via the first clutch K1 and via the actuated coupling device D, that the sixth forward gear G6 may be shifted via the second clutch K2 and via the actuated coupling device C, that the seventh forward gear G7 may be shifted via the first clutch K1 and via the actuated coupling device K, that the eighth forward gear G8 may be shifted via the second clutch K2 and via the actuated coupling device H, and that the ninth forward gear G9 may be carried out via the first clutch K1 and via the actuated coupling device E.

In the third variant embodiment, it is further obvious from the table illustrated in FIG. 6 that a reverse gear R1 may be shifted via the first clutch K1 and via the actuated coupling device F.

Furthermore, an overdrive gear O1 may be shifted as the winding path gear via the second clutch K2 and via the actuated coupling device E as well as via the actuated shift element N. The overdrive gear O1 may be shifted under load ((lsb.) power shifted) from the ninth forward gear G9.

Figure 7:
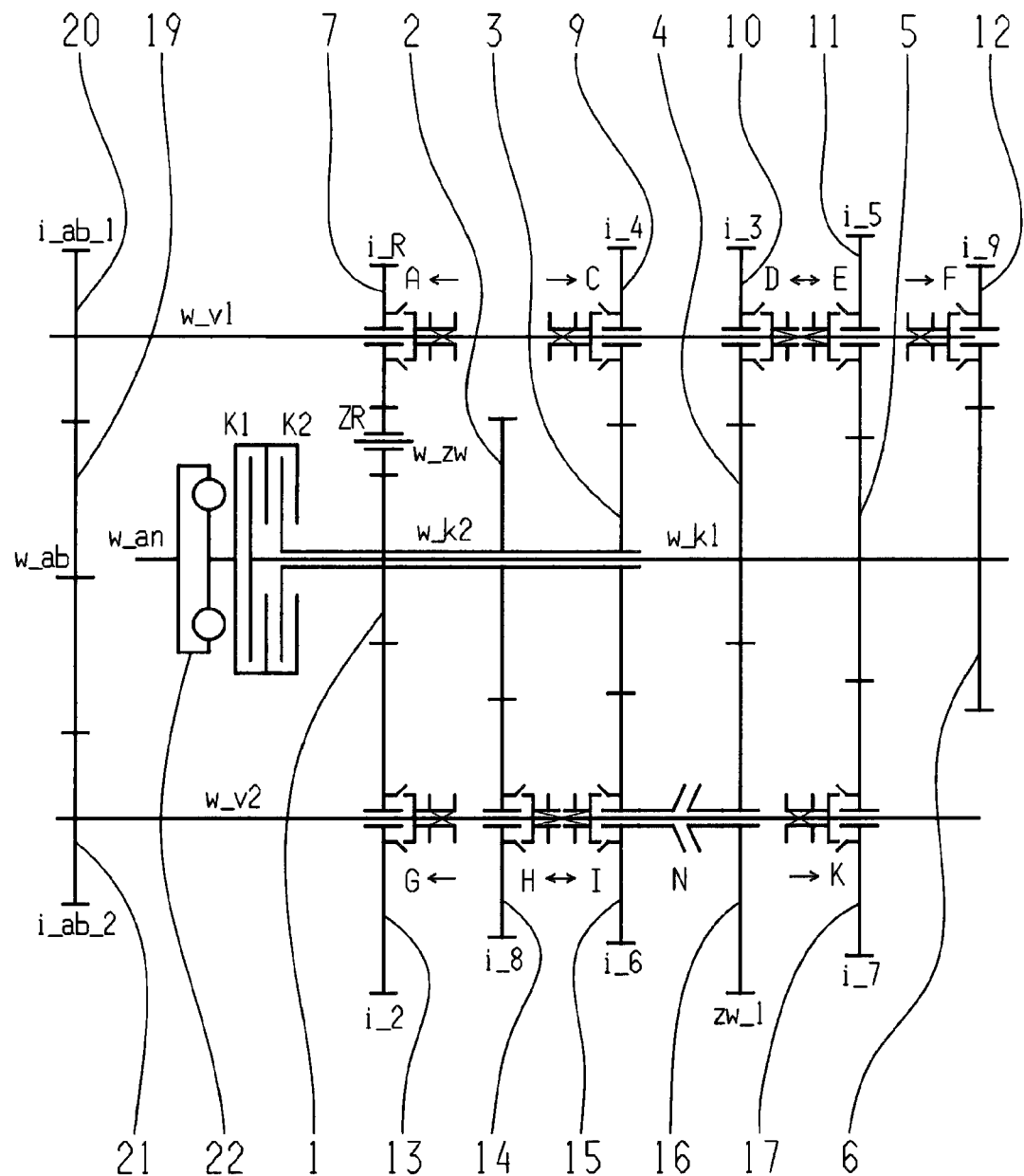
FIG. 7 a schematic view of a fourth variant embodiment of the nine-gear double clutch transmission according to the invention.

The table illustrated in FIG. 8 shows, by way of example, a shift pattern for the fourth variant embodiment of the nine-gear double clutch transmission according to FIG. 7.

The shift pattern shows that the first forward gear G1 may be shifted via the first clutch K1 and via the actuated coupling device G as well as via the actuated shift element N as the winding path gear, that the second forward gear G2 may be shifted via the second clutch K2 and via the actuated coupling device G, that the third forward gear G3 may be shifted via the first clutch K1 and via the actuated coupling device D, that the fourth forward gear G4 may be shifted via the second clutch K2 and via the actuated coupling device C, that the fifth forward gear G5 may be shifted via the first clutch K1 and via the actuated coupling device E, that the sixth forward gear G6 may be shifted via the second clutch K2 and via the actuated coupling device I, that the seventh forward gear G7 may be shifted via the first clutch K1 and via the actuated coupling device K, that the eighth forward gear G8 may be shifted via the second clutch K2 and via the actuated coupling device H, and that the ninth forward gear G9 may be carried out via the first clutch K1 and via the actuated coupling device F.

In the fourth variant embodiment, it is further obvious from the table illustrated in FIG. 8 that a reverse gear R1 may be shifted via the second clutch K2 and via the actuated coupling device A, and/or that a further reverse gear R2 may be shifted via the first clutch K1 and via the actuated coupling device A and via the actuated shift element M as the winding path gear. Furthermore, an additional reverse gear R3 may be shifted via the first clutch K1 and via the actuated coupling device A and via the actuated shift element N as the winding path gear. Advantageously, the reverse gears R2, R3 may be configured in a power shifting manner to the reverse gear R1.

Furthermore, an overdrive gear O1 may be shifted via the second clutch K2, via the actuated coupling device F and via the actuated shift element M as the winding path gear in the double clutch transmission according to the fourth variant embodiment. Furthermore, an additional overdrive gear O2 may be shifted via the second clutch K2, via the actuated coupling device K and via the actuated shift element N as the winding path gear. Finally, a further overdrive gear O3 may be shifted via the second clutch K2 and via the actuated coupling device F and via the actuated shift element N as the winding path gear. The overdrive gears O1 and O3 may be configured in a power shifting manner to the ninth forward gear G9.

Figure 9:
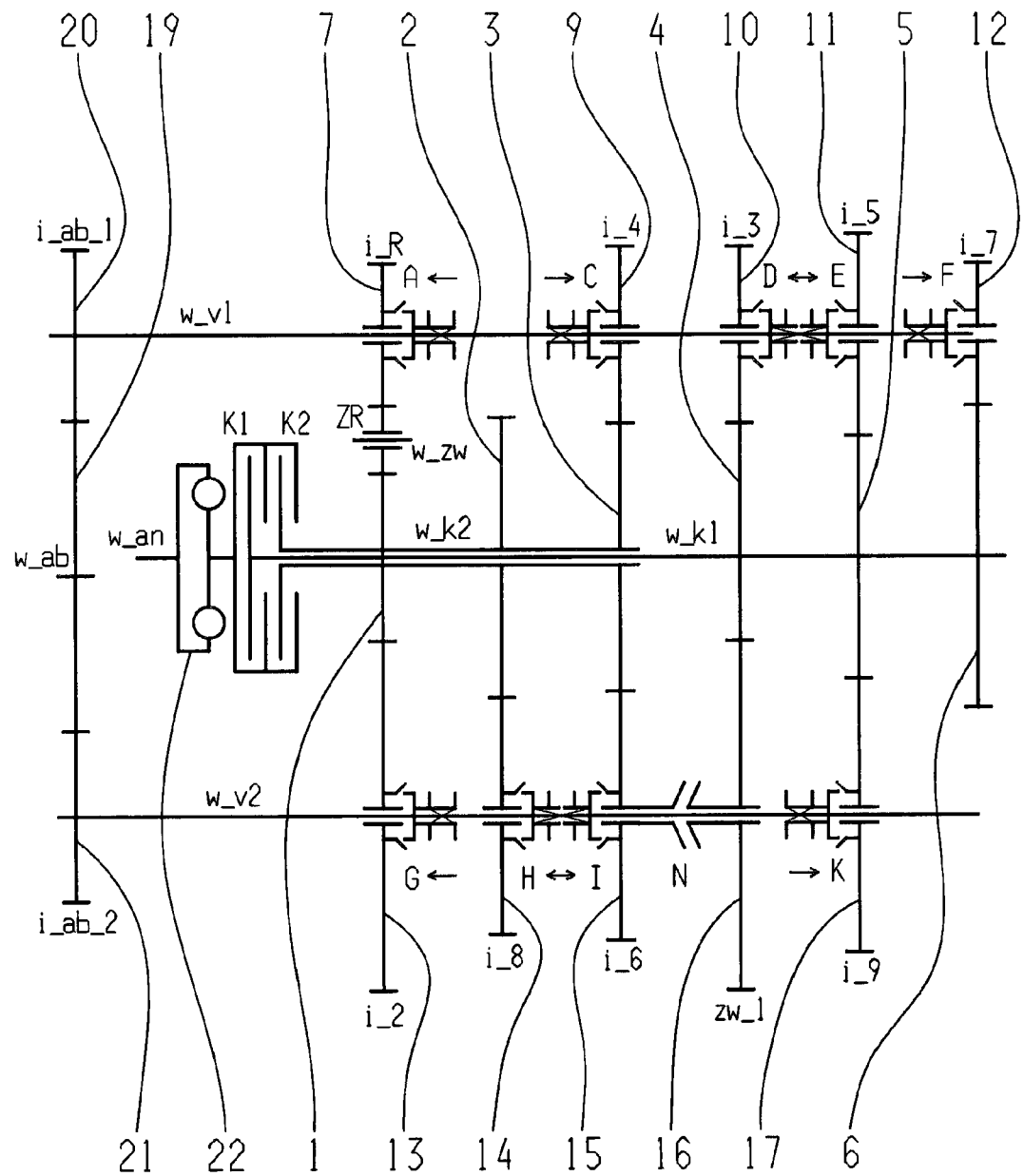
FIG. 9 a schematic view of a fifth variant embodiment of the nine-gear double clutch transmission according to the invention.

The table illustrated in FIG. 10 shows, by way of example, a shift pattern for the fifth variant embodiment of the nine-gear double clutch transmission according to FIG. 9.

The shift pattern shows that the first forward gear G1 may be shifted via the first clutch K1 and via the actuated coupling device G as well as via the actuated shift element N as the winding path gear, that the second forward gear G2 may be shifted via the second clutch K2 and via the actuated coupling device G, that the third forward gear G3 may be shifted via the first clutch K1 and via the actuated coupling device D, that the fourth forward gear G4 may be shifted via the second clutch K2 and via the actuated coupling device C, that the fifth forward gear G5 may be shifted via the first clutch K1 and via the actuated coupling device E, that the sixth forward gear G6 may be shifted via the second clutch K2 and via the actuated coupling device I, that the seventh forward gear G7 may be shifted via the first clutch K1 and via the actuated coupling device F, that the eighth forward gear G8 may be shifted via the second clutch K2 and via the actuated coupling device H, and that the ninth forward gear G9 may be carried out via the first clutch K1 and via the actuated coupling device K.

In the fifth variant embodiment, the table illustrated in FIG. 10 also shows that a reverse gear R1 may be shifted via the second clutch K2 and via the actuated coupling device A. Furthermore, a further reverse gear R2 may be shifted via the first clutch K1 and via the actuated coupling device A as well as via the actuated shift element M as the winding path gear. Therefore, the reverse gear R1 and the reverse gear R2 may be power shifted to each other. Furthermore, a subsequent reverse gear R3 may be shifted via the first clutch K1 and via the actuated coupling device A as well as via the actuated shift element N at the second countershaft w_v2 as the winding path gear. Accordingly, the reverse gear R3 may also be carried out in a power shifting manner to the reverse gear R1.

Furthermore, an overdrive gear O1 can be shifted via the second clutch K2 and via the actuated coupling device F as well as via the actuated shift element M as the winding path gear. Further, an additional overdrive gear O2 may be shifted via the second clutch K2 and via the actuated coupling device K as well as via the actuated shift element M as the winding path gear. Also, an overdrive gear O3 may be shifted via the second clutch K2 and via the actuated coupling device K as well as via the actuated shift element N as the winding path gear. Finally, a subsequent overdrive gear O4 may be shifted via the clutch K2 and via the actuated coupling device F as well as via the actuated shift element N as the winding path gear. The overdrive gears O2 and O3 may be carried out in a power shifting manner to the ninth forward gear G1 (O2 and O3 power shifted to G9).

Figure 11:
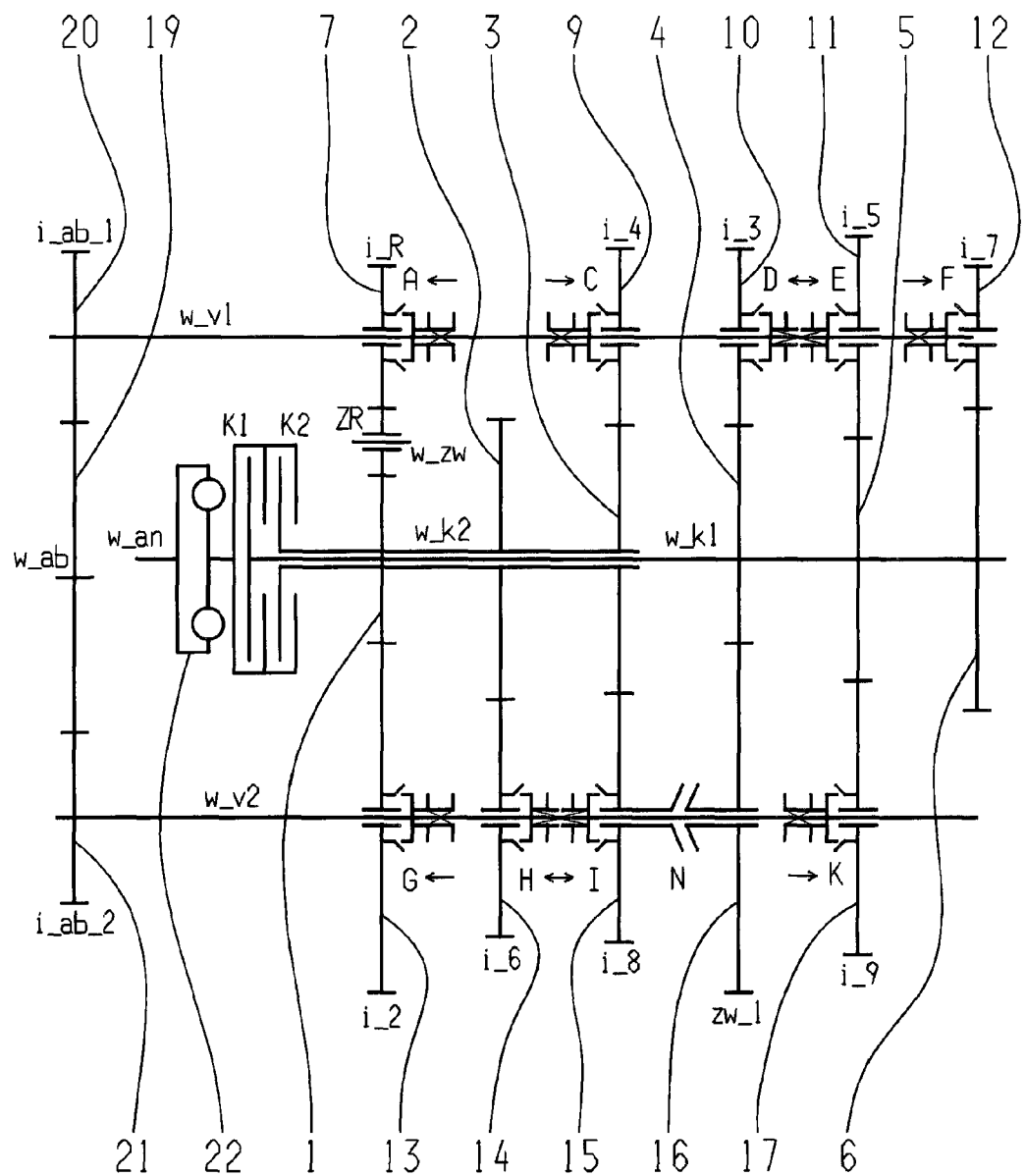
FIG. 11 a schematic view of a sixth variant embodiment of the nine-gear double clutch transmission according to the invention.

The table illustrated in FIG. 12 shows, by way of example, a shift pattern for the sixth variant embodiment of the nine-gear double clutch transmission according to FIG. 11.

The shift pattern shows that the first forward gear G1 may be shifted via the first clutch K1 and via the actuated coupling device G as well as via the actuated shift element N as the winding path gear, that the second forward gear G2 may be shifted via the second clutch K2 and via the actuated coupling device G, that the third forward gear G3 may be shifted via the first clutch K1 and via the actuated coupling device D, that the fourth forward gear G4 may be shifted via the second clutch K2 and via the actuated coupling device C, that the fifth forward gear G5 may be shifted via the first clutch K1 and via the actuated coupling device E, that the sixth forward gear G6 may be shifted via the second clutch K2 and via the actuated coupling device H, that the seventh forward gear G7 may be shifted via the first clutch K1 and via the actuated coupling device F, that the eighth forward gear G8 may be shifted via the second clutch K2 and via the actuated coupling device I, and that the ninth forward gear G9 may be carried out via the first clutch K1 and via the actuated coupling device K.

In the sixth variant embodiment, the table illustrated in FIG. 12 also shows that a reverse gear R1 may be shifted via the second clutch K2 and via the actuated coupling device A, and/or that a further reverse gear R2 (R2 power shifted to R1) may be shifted via the first clutch K1 and via the actuated coupling device A as well as via the actuated shift element M as the winding path gear. Furthermore, an additional reverse gear R3 (R3 power shifted to R1) may be shifted via the first clutch K1 and via the actuated coupling device A as well as via the actuated shift element N as the winding path gear.

Furthermore, an overdrive gear O1 may be carried out via the second clutch K2 and via the actuated coupling device K as well as via the actuated shift element M as the winding path gear (O1 power shifted to G9). As an alternative, or additionally, a further overdrive gear O2 (O2 power shifted to G9) may be carried out via the second clutch K2 and via the actuated coupling device K as well as via the actuated shift element N as the winding path gear power shifted (lsb.) to the ninth forward gear G9.

The shift pattern according to FIG. 2 shows, in detail, that in the first forward gear G1 based on the first clutch K1 the gear stages i_3, i_4, and i_2 are utilized, wherein the two subtransmissions are coupled via the shift element N in the first variant embodiment. Furthermore, the gear stage i_2 is utilized in the second forward gear G2, the gear stage i_3 in the third forward gear G3, the gear stage i_4 in the fourth forward gear G4, the gear stage i_5 in the fifth forward gear G5, the gear stage i_6 in the sixth forward gear G6, the gear stage i_7 in the seventh forward gear G7, the gear stage i_8 in the eighth forward gear G8, and the gear stage i_9 in the ninth forward gear G9. Also, the gear stage i_R is utilized in the reverse gear R1. Furthermore, based on the first clutch K1, the gear stages i_R, i_2 and i_4 are utilized in the further reverse gear R2, wherein the shift element M is actuated for coupling the two subtransmissions. Additionally, based on the second clutch K2, the gear stages i_4, i_3 and i_R are utilized in the reverse gear R3, wherein the shift element N is actuated for coupling the two subtransmissions. Based on the second clutch K2, the gear stages i_4, i_3 and i_9 are utilized with the overdrive gear O1, wherein the two subtransmissions are coupled via the shift element N.

The shift pattern according to FIG. 4 shows, in detail, that in the first forward gear G1 based on the first clutch K1 the gear stages i_3, i_4 and i_2 are utilized, wherein the two subtransmissions are coupled via the shift element N in the first variant embodiment. Furthermore, the gear stage i_2 is utilized in the second forward gear G2, the gear stage i_3 in the third forward gear G3, the gear stage i_4 in the fourth forward gear G4, the gear stage i_5 in the fifth forward gear G5, the gear stage i_6 in the sixth forward gear G6, the gear stage i_7 in the seventh forward gear G7, the gear stage i_8 in the eighth forward gear G8, and the gear stage i_9 in the ninth forward gear G9. Further, based on the second clutch K2 the gear stage i_R is utilized in the reverse gear R1. Furthermore, the gear stages i_3, i_4 and i_R are utilized in the further reverse gear R2 based on the first clutch K1, wherein the two subtransmissions are coupled via the shift element N. Based on the second clutch K2 the gear stages i_4, i_3 and i_9 are utilized in the overdrive gear O1, wherein the two subtransmissions are coupled via the shift element N.

The shift pattern according to FIG. 6 shows, in detail, that based on the first clutch K1 the gear stages i_3, i_4 and i_2 are utilized in the first forward gear G1, wherein the two subtransmissions are coupled via the shift element N. Furthermore, the gear stage i_2 is utilized in the second forward gear G2, the gear stage i_3 in the third forward gear G3, the gear stage i_4 in the fourth forward gear G4, the gear stage i_5 in the fifth forward gear G5, the gear stage i_6 in the sixth forward gear G6, the gear stage i_7 in the seventh forward gear G7, the gear stage i_8 in the eighth forward gear G8, and the gear stage i_9 in the ninth forward gear G9 based on the first clutch K1. Also, based on the first clutch K1, the gear stage i_R is utilized in the reverse gear R1. Furthermore, based on the second clutch K2 the gear stages i_4, i_3 and i_9 are utilized in the overdrive gear O1, wherein the two subtransmissions are coupled via the shift element N The shift pattern according to FIG. 8 shows, in detail, that in the first forward gear G1 the gear stages ZW_1, i_6 and i_2 are utilized, wherein the two subtransmissions are coupled via the shift element N. Furthermore, the gear stage i_2 is utilized in the second forward gear G2, the gear stage i_3 in the third forward gear G3, the gear stage i_4 in the fourth forward gear G4, the gear stage i_5 in the fifth forward gear G5, the gear stage i_6 in the sixth forward gear G6, the gear stage i_7 in the seventh forward gear G7, the gear stage i_8 in the eighth forward gear G8, and the gear stage i_9 in the ninth forward gear G9. Also, based on the second clutch K2 the gear stage i_R is utilized in the reverse gear R1. In the further reverse gear R2, based on the first clutch K1, the gear stages i_3, i_4 and i_R are utilized, wherein the two subtransmissions are coupled via the shift element M. Based on the first clutch K1, the further reverse gear R3 utilizes gear stages ZW_1, i_6 and i_R wherein the two subtransmissions are coupled to each other via the shift element N. In the overdrive gear O1, based on the second clutch K2, the gear stages i_4, i_3 and i_9 are utilized, wherein the two subtransmissions are coupled to each other via the shift element M. Furthermore, based on the second clutch K2, the gear stages i_6, ZW_1 and i_7 are utilized in the overdrive gear O2, wherein the two subtransmissions are coupled to each other via the shift element N. Finally, based on the second clutch K2, the gear stages i_6, ZW_1 and i_9 are utilized in the overdrive gear O3, wherein the two subtransmissions are coupled to each other via the shift element N.

The shift pattern according to FIG. 10 shows, in detail, that in the first forward gear G1 the gear stages ZW_1, i_6 and i_2 are utilized, wherein the two subtransmissions are coupled via the shift element N. Furthermore, the gear stage i_2 is utilized in the second forward gear G2, the gear stage i_3 in the third forward gear G3, the gear stage i_4 in the fourth forward gear G4, the gear stage i_5 in the fifth forward gear G5, the gear stage i_6 in the sixth forward gear G6, the gear stage i_7 in the seventh forward gear G7, the gear stage i_8 in the eighth forward gear G8, and the gear stage i_9 in the ninth forward gear G9. Also, based on the second clutch K2 the gear stage i_R is utilized in the reverse gear R1. In the further reverse gear R2, based on the first clutch K1, the gear stages i_3, i_4 and i_R are utilized, wherein the two subtransmissions are coupled via the shift element M. Based on the first clutch K1 the gear stages ZW_1, i_6 and i_R are utilized in the further reverse gear R3, wherein the two subtransmissions are coupled to each other via the shift element N. In the overdrive gear O1, based on the second clutch K2, the gear stages i_4, i_3 and i_7 are utilized, wherein the two subtransmissions are coupled to each other via the shift element M. Furthermore, based on the second clutch K2, the gear stages i_4, i_3 and i_9 are utilized in the subsequent overdrive gear O2, wherein the two subtransmissions are coupled to each other via the shift element M. Furthermore, based on the second clutch K2 the gear stages i_6, ZW_1 and i_9 are utilized in the further overdrive gear O3, wherein the two subtransmissions are coupled to each other via the shift element N. Finally, based on the second clutch K2 the gear stages i_6, ZW_1 and i_7 are utilized in the subsequent overdrive gear O4, wherein the two subtransmissions are coupled to each other via the shift element N.

The shift pattern according to FIG. 12 shows in detail that in the first forward gear G1 the gear stages ZW_1, i_8 and i_2 are utilized based on the first clutch K1, wherein the two subtransmissions are coupled via the shift element N. Furthermore, the gear stage i_2 is utilized in the second forward gear G2, the gear stage i_3 in the third forward gear G3, the gear stage i_4 in the fourth forward gear G4, the gear stage i_5 in the fifth forward gear G5, the gear stage i_6 in the sixth forward gear G6, the gear stage i_7 in the seventh forward gear G7, the gear stage i_8 in the eighth forward gear G8, and the gear stage i_9 in the ninth forward gear G9. Also, based on the second clutch K2 the gear stage i_R is utilized in the reverse gear R1. In the further reverse gear R2, based on the first clutch K1, the gear stages i_3, i_4 and i_R are utilized, wherein the two subtransmissions are coupled via the shift element M. Based on the first clutch K1, the gear stages ZW_1, i_8 and i_R are utilized in the further reverse gear R3, wherein the two subtransmissions are coupled to each other via the shift element N. In the overdrive gear O1, based on the second clutch K2, the gear stages i_4, i_3 and i_9 are utilized, wherein the two subtransmissions are coupled to each other via the shift element M. Furthermore, based on the second clutch K2, the gear stages i_8, ZW_1 and i_9 are utilized in the subsequent overdrive gear O2, wherein the two subtransmissions are coupled to each other via the shift element N.

In summary, the first to third variant embodiments according to FIGS. 1 to 6 show a winding path gear in the first forward gear G1 via the toothed gearwheel stages of the third, fourth and second gears. The overdrive gear O1, that can be power shifted to the ninth forward gear G9, may be utilized as a possible tenth forward gear in order to save fuel.

The first variant embodiment according to FIGS. 1 and 2 further shows that the first forward gear G1, the third forward gear G3, and the reverse gear R2 are shifted via the first clutch K1 such that the second clutch K2 may be dimensioned as a smaller size.

The first variant embodiment shows, in detail, that the idler gear 13 is utilized for one forward gear G6 at the first gear plane 1-13 as the single gear plane. The idler gear 14 is utilized for one forward gear G8 at the second gear plane 2-14. The idler gear 9 is utilized for two forward gears G1, G2 and for one reverse gear R2 at the third gear plane 9-15 as the dual gear plane, and the idler gear 15 is utilized for three forward gears G1, G4 and O1 and for two reverse gears R2, R3. The idler gear 10 is utilized for three reverse gears R1, R2, R3, and the idler gear 16 is utilized for three forward gears G1, G3, O1 and for one reverse gear R3 at the fourth gear plane 10-16, as the dual gear plane. The idler gear 11 is utilized for one forward gear G5, and the idler gear 17 is utilized for one forward gear G7 at the fifth gear plane 11-17, as the dual gear plane. Finally, the idler gear 12 is utilized for two forward gears G9, O1 at the sixth gear plane 12-6, as the single gear plane.

In summary, a balanced clutch load is obtained in the second variant embodiment according to FIGS. 3 and 4, as the first forward gear G1 and the third forward gear G3 are shifted via the first clutch K1, and the second forward gear G2 and the reverse gear R1 are shifted via the second clutch K2. In this manner, a similar clutch dimensioning is achieved. Due to the fact that the seventh forward gear G7 is disposed on a single gear plane to the sixth forward gear G6 and to the eighth forward gear G8, the transmission stages are better to adjust.

The second variant embodiment shows, in detail, that the idler gear 13 is utilized for one forward gear G6 at the first gear plane 1-13 as the single gear plane. The idler gear 8 is utilized for two reverse gears R1, R2, and the idler gear 14 is utilized for one forward gear G8 at the second gear plane 8-14, as the dual gear plane. The idler gear 9 is utilized for two forward gears G1, G2 at the third gear plane 9-15, as the dual gear plane, and the idler gear 15 is utilized for three forward gears G1, G4, O1 and for one reverse gear R2. The idler gear 16 is utilized for three forward gears G1, G3, and O1 and for one reverse gear R2 at the fourth gear plane 4-16, as the single gear plane. The idler gear 11 is utilized for one forward gear G5, and the idler gear 17 is utilized for two forward gears G9, O1 at the fifth gear plane 11-17, as the dual gear plane. Finally, the idler gear 12 is utilized for one forward gear G7 at the sixth gear plane 12-6 as the single gear plane.

In summary, a lower bearing and shaft load is obtained in the third variant embodiment according to FIGS. 5 and 6, since the second forward gear G2 and the reverse gear R1 are disposed on the shaft ends. Furthermore, a free selection of transmission ratios is achieved for the reverse gear R1.

The third variant embodiment shows, in detail, that the idler gear 13 is utilized for two forward gears G1, G2 at the first gear plane 1-13 as the single gear plane. The idler gear 14 is utilized for one forward gear G8 at the second gear plane 2-14 as the single gear plane. The idler gear 9 is utilized for one forward gear G6 at the third gear plane 9-15 as the dual gear plane, and the idler gear 15 is utilized for three forward gears G1, G4, O1. The idler gear 10 is utilized for one forward gear G5, and the idler gear 16 is utilized for three forward gears G1, G3, O1 at the fourth gear plane 10-16 as the dual gear plane. The idler gear 11 is utilized for two forward gears G9, O1, and the idler gear 17 is utilized for one forward gear G7 at the fifth gear plane 11-17 as the dual gear plane. Finally, the idler gear 12 is utilized for one reverse gear R1 at the sixth gear plane 12-6 as the single gear plane.

In summary, a winding path gear is obtained for the fourth and fifth variant embodiments in the first forward gear G1 via an additional gear stage ZW_1, the sixth gear stage i_6, and the second gear stage i_2, wherein the additional gear stage ZW_1 is utilized in no other forward gear. Furthermore, a possible tenth forward gear is realized using the overdrive gear O1, O2, or O2, O3 that can be power shifted to the ninth forward gear G9, thus saving fuel.

In the fourth variant embodiment, according to FIGS. 7 and 8, a good adjustability of the stages of said gear set is obtained, among others, via the additional gear stage ZW_1 and via the gear stages 8 and 9 on single gear planes.

The fourth variant embodiment shows, in detail, that the idler gear 7 is utilized for three reverse gears R1, R2, R3, and the idler gear 13 is utilized for two forward gears G1, G2 at the first gear plane 7-13, as the dual gear plane. The idler gear 14 is utilized for one forward gear G8 at the second gear plane 2-14, as the single gear plane. The idler gear 9 is utilized for two forward gears G4, O1 and for one reverse gear R2 at the third gear plane 9-15, as the dual gear plane, and the idler gear 15 is utilized for four forward gears G1, G6, O2, O3 and for one reverse gear R3. The idler gear 10 is utilized for two forward gears G3, O1 and for one reverse gear R2, and the idler gear 16 is utilized for three forward gears G1, O2, O3 and for one reverse gear R3 at the fourth gear plane 10-16, as the dual gear plane. The idler gear 11 is utilized for one forward gear G5, and the idler gear 17 is utilized for two forward gears G7, O2 at the fifth gear plane 11-17, as the dual gear plane. Finally, the idler gear 12 is utilized for three forward gears G9, O1, O3 at the sixth gear plane 12-6, as the single gear plane.

In summary, a further improved adjustment of the transmission stages is obtained in the fifth variant embodiment, according to FIGS. 9 and 10, as opposed to the fourth variant embodiment, as the seventh forward gear G7 is disposed on a single gear plane.

The fifth variant embodiment shows, in detail, that the idler gear 7 is utilized for three reverse gears R1 to R3, and the idler gear 13 is utilized for two forward gears G1, G2 at the first gear plane 7-13 as the dual gear plane. The idler gear 14 is utilized for one forward gear G8 at the second gear plane 2-14, as the single gear plane. The idler gear 9 is utilized for three forward gears G4, O1, O2 and for one reverse gear R2 at the third gear plane 9-15, as the dual gear plane, and the idler gear 15 is utilized for four forward gears G1, G6, O3, O4 and for one reverse gear R3. The idler gear 10 is utilized for three forward gears G3, O1, O2 and for one reverse gear R2, and the idler gear 16 is utilized for three forward gears G1, O3, O4 and for one reverse gear R3 at the fourth gear plane 10-16, as the dual gear plane. The idler gear 11 is utilized for one forward gear G5, and the idler gear 17 is utilized for three forward gears G9, O2, O3 at the fifth gear plane 11-17, as the dual gear plane. Finally, the idler gear 12 is utilized for three forward gears G7, O1, O4 at the sixth gear plane 12-6, as the single gear plane.

In summary, in the sixth variant embodiment, according to FIGS. 11 and 12, a winding path gear is obtained in the first forward gear G1 via an additional gear stage ZW_1, the eighth gear stage i_8, and the second gear stage i_2, wherein the additional gear stage ZW_1 is not utilized in any other forward gear. Furthermore, an overdrive gear O1, O2 that can be power shifted to the ninth forward gear G9 is obtained as a possible tenth forward gear, leading to fuel savings. Also, high transmission ratios may be set in the first forward gear G1 and in the reverse gear R3 that can be power shifted to the reverse gear R1 due to the use of the eighth gear step i_8 as the second transmission ratio in the winding path gear. In contrast, small transmission ratios may be set in the overdrive gear O2 due to the use of the eighth gear stage i_8 as the first transmission ratio.

The sixth variant embodiment shows, in detail, that the idler gear 7 is utilized for three reverse gears R1 to R3, and the idler gear 13 is utilized for two forward gears G1, G2 at the first gear plane 7-13 as the dual gear plane. The idler gear 14 is utilized for one forward gear G6 at the second gear plane 2-14 as the single gear plane. The idler gear 9 is utilized for two forward gears G4, O1 and for one reverse gear R2 at the third gear plane 9-15 as the dual gear plane, and the idler gear 15 is utilized for three forward gears G1, G8, O2 and for one reverse gear R3. The idler gear 10 is utilized for two forward gears G3, O1 and for one reverse gear R2, and the idler gear 16 is utilized for two forward gears G1, O2 and for one reverse gear R3 at the fourth gear plane 10-16 as the dual gear plane. The idler gear 11 is utilized for one forward gear G5, and the idler gear 17 is utilized for three forward gears G9, O2, O3 at the fifth gear plane 11-17 as the dual gear plane. Finally, the idler gear 12 is utilized for one forward gear G7 at the sixth gear plane 12-6 as the single gear plane.

It is possible that in one or more variant embodiments, at least one additional toothed gearwheel stage, or an intermediate gear stage ZW_1 is utilized for winding path gears that are not utilized in any direct gear.

In all variant embodiments of the double clutch transmission fewer gear planes, and thus fewer components, are necessary at a consistent number of gears due to said multiple uses of individual idler gears provided such that an advantageous construction space and cost savings is brought about.

Regardless of the respective variant embodiment the numeral "1" in a field of the respective table of the shift pattern according to FIGS. 2, 4, 6, 8, 10 and 12 means that the associated clutch K1, K2, or the associated coupling device A, B, C, D, E, F, G, H, I, J, K, or the associated shift element M, N is engaged. In contrast, a free field, in the respective table of the shift pattern according to FIGS. 2, 4, 6, 8, 10 and 12, means that the associated clutch K1, K2, or the associated coupling device A, B, C, D, E, F, G, H, I, J, or the associated shift element M, N is disengaged. Furthermore, it is possible in many cases to incorporate further coupling or shift elements without having an adverse effect on the flow of power. In this manner a pre-selection of gears may be enabled.

REFERENCE SYMBOLS

1 fixed gear of the second transmission input shaft
2 fixed gear of the second transmission input shaft
3 fixed gear of the second transmission input shaft
4 fixed gear of the first transmission input shaft
5 fixed gear of the first transmission input shaft
6 fixed gear of the first transmission input shaft
7 idler gear of the first countershaft
8 idler gear of the first countershaft
9 idler gear of the first countershaft
10 idler gear of the first countershaft
11 idler gear of the first countershaft
12 idler gear of the first countershaft
13 idler gear of the second countershaft
14 idler gear of the second countershaft
15 idler gear of the second countershaft
16 idler gear of the second countershaft
17 idler gear of the second countershaft
19 fixed gear of the output shaft
20 output gear of the first countershaft
21 output gear of the first countershaft
22 torsion vibration damper
K1 first clutch
K2 second clutch
w_an drive shaft
w_ab output shaft
w_v1 first countershaft
w_v2 second countershaft
w_k1 first transmission input shaft
w_k2 second transmission input shaft
A coupling device
B coupling device
C coupling device
D coupling device
E coupling device
F coupling device
G coupling device
H coupling device
I coupling device
J coupling device
K coupling device
i_1 gear stage first forward gear
i_2 gear stage second forward gear
i_3 gear stage third forward gear
i_4 gear stage fourth forward gear
i_5 gear stage fifth forward gear
i_6 gear stage sixth forward gear
i_7 gear stage seventh forward gear
i_8 gear stage eighth forward gear
i_9 gear stage ninth forward gear
ZW_1 intermediate stage gear
G1 first forward gear
G2 second forward gear
G3 third forward gear
G4 fourth forward gear
G5 fifth forward gear
G6 sixth forward gear
G7 seventh forward gear
G8 eighth forward gear
G9 ninth forward gear
O1 overdrive gear (overdrive)
O2 overdrive gear
O3 overdrive gear
O4 overdrive gear
R1 reverse gear
R2 reverse gear R3 reverse gear
w_zw intermediate shaft
ZR intermediate gear
ZS gear stage utilized
M shift element
N shift element
lsb. power shifted

The invention claimed is:

1. A double clutch transmission comprising:
   first and second clutches (K1, K2) each comprising and input side connected to a drive shaft (w_an) and an output side respectively connected to one of a first and a second transmission input shaft (w_k1, w_k2) coaxially arranged relative to one another;
   at least first and second countershafts (w_v1, w_v2) upon which toothed idler gearwheels (7, 8, 9, 10, 11, 12, 13, 14, 15, 16, 17) are supported;
   toothed fixed gearwheels (1, 2, 3, 4, 5, 6) being supported on each of the first and the second transmission input shafts (w_k1, w_k2) in a rotationally fixed manner, and each of the fixed gearwheels (1, 2, 3, 4, 5, 6) meshing with at least one of the idler gearwheels (7, 8, 9, 10, 11, 12, 13, 14, 15, 16, 17);
   a plurality of coupling devices (A, B, C, D, E, F, G, H, I, J, K), each coupling an idler gearwheel (7, 8, 9, 10, 11, 12, 13, 14, 15, 16, 17) to one of the first and the second countershafts (w_v1, w_v2) in a rotationally fixed manner;
   an output gear (20, 21) being supported on each of the first and the second countershafts (w_v1, w_v2), each of the output gears (20, 21) being coupled to a gearing of an output shaft (w_ab);
   at least one shift element (N) for coupling two of the idler gearwheels (7, 8, 9, 10, 11, 12, 13, 14, 15, 16, 17) in a rotationally fixed manner whereby a plurality of power shifting forward gears (1, 2, 3, 4, 5, 6, 7, 8, 9) and at least one reverse gear (R1, R3) can be shifted;
   six gear planes (1-13, 7-13, 2-14, 8-14, 9-15, 4-16, 10-16, 11-17, 12-6) comprising at least three dual gear planes (7-13, 8-14, 9-15, 10-16, 11-17) and at least two single gear planes (1-13, 2-14, 4-16, 12-6);
   each of the at least three dual gear planes (7-13, 8-14, 9-15, 10-16, 11-17) comprising an idler gearwheel (7, 8, 9, 10, 11, 13, 14, 15, 16, 17) of each of the first and the second countershafts (w_v1, w_v2) and a fixed gearwheel (1, 2, 3, 4, 5) of one of the first and the second transmission input shafts (w_k1, w_k2), at least one of the idler gearwheels (7, 8, 9, 10, 11, 13, 14, 15, 16, 17) in each of the dual gear planes (7-13, 8-14, 9-15, 10-16, 11-17) being utilized for at least two gears; and
   each of the at least two single gear planes (1-13, 2-14, 4-16, 12-6) comprising one idler gearwheel (12, 13, 14, 16) of the first and the second countershafts (w_v1, w_v2) and a fixed gearwheel (1, 2, 4, 6) of one of the first and the second transmission input shafts (w_K1, w_K2) such that at least one power shifting winding path gear is shifted via the at least one shift element (N).

2. The double clutch transmission according to claim 1, wherein the six gear planes comprise three dual gear planes (8-14, 9-15, 10-16, 11-17) and three single gear planes (1-13, 2-14, 4-16, 12-6).

3. The double clutch transmission according to claim 1, wherein the six gear planes comprise four dual gear planes (7-13, 9-15, 10-16, 11-17) and two single gear planes (2-14, 12-6).

4. The double clutch transmission according to claim 1, wherein an idler gearwheel (15) of a second sub-transmission is connectable to an idler gearwheel (16) of a first sub-transmission supported on the second countershaft (w_v2) via the at least one shift element (N) such that at least a first forward gear (G1) and one reverse gear (R2, R3) and at least one overdrive gear (O1, O2, O3) are shifted as the at least one power shifting winding path gear via the at least one shift element (N).

5. The double clutch transmission according to claim 1, wherein a first gear plane (1-13) is a single gear plane, a second gear plane (2-14) is one of a single gear plane and a dual gear plane, and a third gear plane (9-15) is one of a dual gear plane, and each of the first, the second and the third gear planes comprise one of three fixed gearwheels (1, 2 of 3) of the second transmission input shaft (w_k2) of a second sub-transmission.

6. The double clutch transmission according to claim 5, wherein a fourth gear plane (10-16, 4-16) is one of a dual gear plane and a single gear plane, a fifth gear plane (11-17) is a dual gear plane, and a sixth gear plane (12-6) is a single gear plane, and each of the fourth, the fifth and the sixth gear planes comprise three fixed gearwheels (4, 5 or 6) of the first transmission input shaft (w_k1) of a first sub-transmission.

7. The double clutch transmission according to claim 1, wherein a first gear plane (7-13) is a dual gear plane, a second gear plane (2-14) is a single gear plane, and a third gear plane (9-15) is a dual gear plane, and each of the first, the second and the third gear planes comprise three fixed gearwheels (1, 2 or 3) of the second transmission input shaft (w_k2) of a second sub-transmission.

8. The double clutch transmission according to claim 7, wherein a fourth gear plane (10-16) and a fifth gear plane (11-17) are dual gear planes and a sixth gear plane (12-6) is a single gear plane, and each of the fourth, the fifth and the sixth gear planes comprise three fixed gearwheels (4, 5 or 6) of the first transmission input shaft (w_k1) of a first sub-transmission.

9. The double clutch transmission according to claim 1, wherein
   a first forward gear (G1) is shiftable as a first one of the at least one power shifting winding path gear via activation of the first clutch (K1) and a third coupling device (C), and the at least one shift element (N);
   a second forward gear (G2) is shiftable via activation of the second clutch (K2) and the third coupling device (C);
   a third forward gear (G3) is shiftable via activation of the first clutch (K1) and a tenth coupling device (J);
   a fourth forward gear (G4) is shiftable via activation of the second clutch (K2) and a ninth coupling device (I);
   a fifth forward gear (G5) is shiftable via activation of the first clutch (K1) and a fifth coupling device (E);
   a sixth forward gear (G6) is shiftable via activation of the second clutch (K2) and a seventh coupling device (G);
   a seventh forward gear (G7) is shiftable via activation of the first clutch (K1) and an eleventh coupling device (K);
   an eighth forward gear (G8) is shiftable via activation of the second clutch (K2) and an eighth coupling device (H); and
   a ninth forward gear (G9) is shiftable via activation of the first clutch (K1) and a sixth coupling device (F).

10. The double clutch transmission according to claim 9, wherein
   a first reverse gear (R1) is shiftable via activation of the first clutch (K1) and a fourth coupling device (D);
   a second reverse gear (R2) is shiftable as a second one of the at least one power shifting winding path gear via activation of the first clutch (K1), the ninth coupling device (I) and a second shift element (M); and a third reverse gear (R3) is shiftable as a third one of the at least one power shifting winding path gear via activation of the second clutch (K2), the fourth coupling device (D) and the at least one shift element (N).

11. The double clutch transmission according to claim 9, wherein an overdrive gear (O1) is shiftable as a second one of the at least one power shifting winding path gears via activation of the second clutch (K2), the sixth coupling device (F) and the at least one shift element (N).

12. The double clutch transmission according to claim 1, wherein
   a first forward gear (G1) is shiftable as a first one of the at least one power shifting winding path gear via activation of the first clutch (K1), a third coupling device (C), and the at least one shift element (N);
   a second forward gear (G2) is shiftable via activation of the second clutch (K2) and the third coupling device (C);
   a third forward gear (G3) is shiftable via activation of the first clutch (K1) and a tenth coupling device (J);
   a fourth forward gear (G4) is shiftable via activation of the second clutch (K2) and a ninth coupling device (I);
   a fifth forward gear (G5) is shiftable via activation of the first clutch (K1) and a fifth coupling device (E);
   a sixth forward gear (G6) is shiftable via activation of the second clutch (K2) and a seventh coupling device (G);
   a seventh forward gear (G7) is shiftable via activation of the first clutch (K1) and a sixth coupling device (F);
   an eighth forward gear (G8) is shiftable via activation of the second clutch (K2) and an eighth coupling device (H); and
   a ninth forward gear (G9) is shiftable via activation of the first clutch (K1) and an eleventh coupling device (K).

13. The double clutch transmission according to claim 12, wherein a first reverse gear (R1) is shiftable via activation of the second clutch (K2) and a second coupling device (B),
   a second reverse gear (R2) is shiftable as a second one of the at least one power shifting winding path gear via activation of the first clutch (K1), the coupling device (B) and the at least one shift element (N).

14. The double clutch transmission according to claim 12, wherein an overdrive gear (O1) is shiftable as a second one of the at least one power shifting winding path gear via activation of the second clutch (K2), the eleventh coupling device (K) and the at least one shift element (N).

15. The double clutch transmission according to claim 1, wherein
   a first forward gear (G1) is shiftable as a first one of the at least one power shifting winding path gear via activation of the first clutch (K1), a seventh coupling device (G), and the at least one shift element (N);
   a second forward gear (G2) is shiftable via activation of the second clutch (K2) and a seventh coupling device (G);
   a third forward gear (G3) is shiftable via activation of the first clutch (K1) and a tenth coupling device (J);
   a fourth forward gear (G4) is shiftable via activation of the second clutch (K2) and a ninth coupling device (I);
   a fifth forward gear (G5) is shiftable via activation of the first clutch (K1) and a fourth coupling device (D);
   a sixth forward gear (G6) is shiftable via activation of the second clutch (K2) and a third coupling device (C);
   a seventh forward gear (G7) is shiftable via activation of the first clutch (K1) and an eleventh coupling device (K);
   an eighth forward gear (G8) is shiftable via activation of the second clutch (K2) and an eighth coupling device (H);
   a ninth forward gear (G9) is shiftable via activation of the first clutch (K1) and a fifth coupling device (E);
   a reverse gear (R1) is shiftable via activation of the first clutch (K1) and a sixth coupling device (F);
   an overdrive gear (O1) is shiftable as a second one of the at least one power shifting winding path gear via activation of the second clutch (K2), the fifth coupling device (E) and the at least one shift element (N).

16. The double clutch transmission according to claim 1, wherein
   a first forward gear (G1) is shiftable as a first one of the at least one power shifting winding path gear via activation of the first clutch (K1), a seventh coupling device (G), and the at least one shift element (N);
   a second forward gear (G2) is shiftable via activation of the second clutch (K2) and a seventh coupling device (G);
   a third forward gear (G3) is shiftable via activation of the first clutch (K1) and a fourth coupling device (D);
   a fourth forward gear (G4) is shiftable via activation of the second clutch (K2) and a third coupling device (C);
   a fifth forward gear (G5) is shiftable via activation of the first clutch (K1) and a fifth coupling device (E);
   a sixth forward gear (G6) is shiftable via activation of the second clutch (K2) and a ninth coupling device (I);
   a seventh forward gear (G7) is shiftable via activation of the first clutch (K1) and an eleventh coupling device (K);
   an eighth forward gear (G8) is shiftable via activation of the second clutch (K2) and an eighth coupling device (H); and
   a ninth forward gear (G9) is shiftable via activation of the first clutch (K1) and a sixth coupling device (F).

17. The double clutch transmission according to claim 16, wherein
   a first reverse gear (R1) is shiftable via activation of the second clutch (K2) and a first coupling device (A);
   a second reverse gear (R2) is shiftable as a second one of the at least one power shifting winding path gear via activation of the first clutch (K1), the first coupling device (A) and a second shift element (M); and
   a third reverse gear (R3) is shiftable as a third one of the at least one power shifting winding path gear via activation of the first clutch (K1), the first coupling device (A) and the at least one shift element (N).

18. The double clutch transmission according to claim 16, wherein
   a first overdrive gear (O1) is shiftable as a second one of the at least one power shifting winding path gear via activation of the second clutch (K2), the sixth coupling device (F) and a second shift element (M);
   a second overdrive gear (O2) is shiftable as a third one of the at least one power shifting winding path gear via activation of the second clutch (K2) and the eleventh coupling device (K) and the at least one shift element (N); and
   a third overdrive gear (O3) is shiftable as a fourth one of the at least one power shifting winding path gear via activation of the second clutch (K2), the sixth coupling device (F) and the at least one shift element (N).

19. The double clutch transmission according to claim 1, wherein
   a first forward gear (G1) is shiftable as a first one of the at least one power shifting winding path gear via activation of the first clutch (K1), a seventh coupling device (G) and the at least one shift element (N);
   a second forward gear (G2) is shiftable via activation of the second clutch (K2) and a seventh coupling device (G);
   a third forward gear (G3) is shiftable via activation of the first clutch (K1) and a fourth coupling device (D);
   a fourth forward gear (G4) is shiftable via activation of the second clutch (K2) and a third coupling device (C);
   a fifth forward gear (G5) is shiftable via activation of the first clutch (K1) and a fifth coupling device (E);

a sixth forward gear (G6) is shiftable via activation of the second clutch (K2) and a ninth coupling device (I);

a seventh forward gear (G7) is shiftable via activation of the first clutch (K1) and a sixth coupling device (F);

an eighth forward gear (G8) is shiftable via activation of the second clutch (K2) and an eighth coupling device (H); and a ninth forward gear (G9) is shiftable via activation of the first clutch (K1) and an eleventh coupling device (K).

20. The double clutch transmission according to claim 19, wherein a first reverse gear (R1) is shiftable via activation of the second clutch (K2) and a first coupling device (A), a second reverse gear (R2) is shiftable as a second one of the at least one power shifting winding path gear via activation of the first clutch (K1), the first coupling device (A) and a second shift element (M), and a third reverse gear (R3) is shiftable as a third one of the at least one power shifting winding path gear via activation of the first clutch (K1), the first coupling device (A) and the at least one shift element (N).

21. The double clutch transmission according to claim 19, wherein a first overdrive gear (O1) is shiftable as a second one of the at least one power shifting winding path gear via activation of the second clutch (K2), the sixth coupling device (F) and a second shift element (M), a second overdrive gear (O2) is shiftable as a third one of the at least one power shifting winding path gear via activation of the second clutch (K2), the eleventh coupling device (K) and the second shift element (M), a third overdrive gear (O3) is shiftable as a fourth one of the at least one power shifting winding path gear via activation of the second clutch (K2), the eleventh coupling device (K) and the at least one shift element (N), and a fourth overdrive gear (O4) is shiftable as a fifth one of the at least one power shifting winding path gear via activation of the second clutch (K2), the sixth coupling device (F) and the at least one shift element (N).

22. The double clutch transmission according to claim 1, wherein a first forward gear (G1) is shiftable as a first one of the at least one power shifting winding path gear via activation of the first clutch (K1), the seventh coupling device (G) and the at least one shift element (N);

a second forward gear (G2) is shiftable via activation of the second clutch (K2) and a seventh coupling device (G);

a third forward gear (G3) is shiftable via activation of the first clutch (K1) and a fourth coupling device (D);

a fourth forward gear (G4) is shiftable via activation of the second clutch (K2) and a third coupling device (C);

a fifth forward gear (G5) is shiftable via activation of the first clutch (K1) and a fifth coupling device (E);

a sixth forward gear (G6) is shiftable via activation of the second clutch (K2) and an eighth coupling device (H);

a seventh forward gear (G7) is shiftable via activation of the first clutch (K1) and a sixth coupling device (F);

an eighth forward gear (G8) is shiftable via activation of the second clutch (K2) and a ninth coupling device (I); and a ninth forward gear (G9) is shiftable via activation of the first clutch (K1) and an eleventh coupling device (K).

23. The double clutch transmission according to claim 22, wherein a first reverse gear (R1) is shiftable via activation of the second clutch (K2) and a first coupling device (A), a second reverse gear (R2) is shiftable as a second one of the at least one power shifting winding path gear via activation of the first clutch (K1), the first coupling device (A) and a second shift element (M), and a third reverse gear (R3) is shiftable as a third one of the at least one power shifting winding path gear via activation of the first clutch (K1), a first coupling device (A) and the at least one shift element (N).

24. The double clutch transmission according to claim 22, wherein a first overdrive gear (O1) is shiftable as a second one of the at least one power shifting winding path gear via activation of the second clutch (K2), the eleventh coupling device (K) and a second shift element (M), and a second overdrive gear (O2) is shiftable as a third one of the at least one power shifting winding path gear via activation of the second clutch (K2), the eleventh coupling device (K) and the at least one shift element (N).

* * * * *